United States Patent
Relan et al.

(10) Patent No.: US 8,863,205 B2
(45) Date of Patent: Oct. 14, 2014

(54) SYSTEM AND METHOD FOR MULTIMEDIA VIEWERSHIP SURVEYING

(75) Inventors: Sandeep Relan, Bangalore (IN);
Brajabandhu Mishra, Bangalore (IN);
Rajendra Khare, Bangalore (IN)

(73) Assignee: Broadcom Corporation, Irvine, CA (US)

( * ) Notice: Subject to any disclaimer, the term of this patent is extended or adjusted under 35 U.S.C. 154(b) by 1854 days.

(21) Appl. No.: 10/826,183

(22) Filed: Apr. 16, 2004

(65) Prior Publication Data

US 2005/0235307 A1    Oct. 20, 2005

(51) Int. Cl.
*H04N 7/173*  (2011.01)
*H04N 21/61*  (2011.01)
*H04N 21/442*  (2011.01)
*H04N 21/466*  (2011.01)
*H04N 21/258*  (2011.01)

(52) U.S. Cl.
CPC ....... *H04N 21/6143* (2013.01); *H04N 21/6118* (2013.01); *H04N 21/44222* (2013.01); *H04N 21/6131* (2013.01); *H04N 21/4667* (2013.01); *H04N 21/25883* (2013.01); *H04N 21/25875* (2013.01); *H04N 21/44204* (2013.01)
USPC .................. 725/95; 725/86; 725/87; 725/91; 725/93; 725/96

(58) Field of Classification Search
None
See application file for complete search history.

(56) References Cited

U.S. PATENT DOCUMENTS

| | | | | |
|---|---|---|---|---|
| 5,758,259 | A * | 5/1998 | Lawler | 725/45 |
| 5,905,522 | A * | 5/1999 | Lawler | 725/131 |
| 6,484,318 | B1* | 11/2002 | Shioda et al. | 725/110 |
| 2002/0059574 | A1* | 5/2002 | Tudor et al. | 725/1 |
| 2002/0083451 | A1* | 6/2002 | Gill et al. | 725/46 |
| 2003/0051249 | A1* | 3/2003 | Hoang | 725/95 |
| 2005/0071882 | A1* | 3/2005 | Rodriguez et al. | 725/95 |
| 2005/0138659 | A1* | 6/2005 | Boccon-Gibod et al. | 725/58 |
| 2006/0140584 | A1* | 6/2006 | Ellis et al. | 386/83 |
| 2006/0294540 | A1* | 12/2006 | Perlman | 725/31 |
| 2007/0124763 | A1* | 5/2007 | Ellis | 725/35 |
| 2007/0157231 | A1* | 7/2007 | Eldering et al. | 725/35 |
| 2007/0240181 | A1* | 10/2007 | Eldering et al. | 725/14 |
| 2007/0261087 | A1* | 11/2007 | Denney et al. | 725/95 |
| 2012/0151526 | A1* | 6/2012 | Lemmons et al. | 725/39 |

* cited by examiner

*Primary Examiner* — Nasser Goodarzi
*Assistant Examiner* — Fred Peng
(74) *Attorney, Agent, or Firm* — Foley & Lardner LLP; Christopher J. McKenna; Paul M. H. Pua

(57) ABSTRACT

Disclosed herein is a method and system for multimedia viewership surveying of an end-user's set-top-box (STB). The multimedia information may be received from at least one satellite via a satellite receiver. The satellite receiver may convey the multimedia information to a service provider location. At the service provider location, a content server may receive a request for transmission of multimedia information. The request may be validated to determine whether the request is authorized. The method may also include monitoring channel requests, and channel viewing times. The method may also include recording and/or logging the channel requests and information associated with the requested program in a user log. The user log may be evaluated to facilitate targeted marketing of end-user subscribers based upon demonstrated television viewing habits.

37 Claims, 12 Drawing Sheets

| 410 | 420 | 430 | 440 | 450 | 460 |
|---|---|---|---|---|---|
| 0005 | 03220610 | 03220714 | 120481 | ... | 99 |
| 0127 | 03220714 | 03221830 | 111410 | ... | 03 |
| 0641 | 03221830 | 03222130 | 367414 | ... | 99 |
| 0002 | 03222130 | 03230615 | 009462 | ... | 11 |
| ... | ... | ... | ... | ... | ... |
| 0012 | 03231800 | 03231830 | 782472 | ... | 99 |

SYSTEM AND METHOD FOR MULTIMEDIA VIEWERSHIP SURVEYING

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Cable television (TV) has become a widely subscribed to commodity. Cable TV typically comprises a plurality of audio/video (A/V) transmissions accumulated in a central office, for example. The A/V transmissions may be accumulated in a content server, for example.

The content server is an information storage unit adapted to collect, accumulate, package, disseminate, and broadcast multimedia data to clients at various locations remote from the central office.

A common central content server may be located in a central office of a service provider. The content server may comprise a plurality of content servers residing in multiple geographic locations.

Typically, cable TV transmissions (channels) are distributed to end-users over cables, thus cable TV. The channels may be distributed from the content server located at the cable TV service provider's location. The service provider's content server transmits all of the channels simultaneously on a single shared cable to an end-user location.

Multiple clients, end-users, and/or customers subscribe to the services (channels) provided by the content server of the service provider. A television set and a set-top-box (STB) may be located at the end-user's location to decode and display the channels. The STB provides end-users access to (decodes) only those channels that the end-user subscribes.

Ordinarily, there may be a signal distribution unit situated at the cable TV service provider's location. The signal distribution unit is adapted to receive all channels from at least one satellite signal-receiving unit, and subsequently from at least one satellite. The subscribing end-user's STB is connected to the end-user's TV set. The end-user may be provided with a smart card for authentication and identification purposes.

Each end-user may subscribe to different channel packages, that is, the number of channels subscribed to by each end-user may vary. Cables connect the signal distribution unit at the service provider's location to each STB and TV set at each individual end-user location. The signal distribution unit transmits all of the received channels to all of the end-user locations at once.

The STB is adapted to permit access (viewing) to channels that the end-user has subscribed, while barring access (denying viewing) to channels that the end-user has not subscribed. The end-user may select a subscribed channel for viewing by remotely controlling the STB, causing the STB to decode and send a particular channel to the TV set for display and viewing.

Because all channels are being transmitted together to each end-user location, end-users may be able to illegally decode unsubscribed channels for viewing causing the service provider to lose revenue.

Additionally, as the number of channels being transmitted increases, the amount of bandwidth required for transmission increases. The vast majority of bandwidth, however, is wasted. End-users typically watch one or two channels at a time on a particular TV set. The result is that in many instances, as much as or more than 99% of the bandwidth (channels) being transmitted is wasted and not viewed. Further, there is a significant waste of power because of transmission of all the channels all the time.

Further, there is no definitive way to retrieve channel viewership information in current cable TV systems.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspects of the present invention may be found in a multimedia distribution network comprising a plurality of set-top-boxes (STBs) adapted to request a multimedia channel. The network may also comprise a content server; a distribution unit; and a use meter. The use meter may be adapted to monitor channel requests and evaluate information associated with channel requests to determine viewing habits and interests of viewers for each of the plurality of STBs.

In an embodiment according to the present invention, the content server may be adapted to receive and manage a plurality of multimedia transmissions from at least one satellite receiver. The plurality of multimedia transmissions may each comprise a plurality of multimedia channels.

In an embodiment according to the present invention, the distribution unit may be adapted to independently transmit on-demand a requested multimedia channel and an associated requested corresponding bandwidth to each of the plurality of STBs.

In an embodiment according to the present invention, each of the plurality of end-user STBs may be adapted to independently request a multimedia channel. The distribution unit may be adapted to acquire each requested multimedia channel from the content server and independently transmit each requested multimedia channel respectively to each requesting STB on-demand.

In an embodiment according to the present invention, the network may further comprise a use memory. The use memory may be adapted to store monitored channel request information corresponding to each of the plurality of STBs for evaluation. The use memory may also be adapted to record a length of viewing time corresponding to each channel request. The use memory may also be adapted to record the bandwidth consumed corresponding to each respective channel request.

In an embodiment according to the present invention, the network may further comprise a use memory. The use meter may be adapted to create and populate a plurality of user logs in the use memory. The user logs may be adapted to store monitored channel request information, bandwidth consumed for each corresponding channel request, and length of viewing time of multimedia channel information for each of the plurality of STBs.

In an embodiment according to the present invention, the user logs may comprise at least one of a channel identification number, a channel viewing beginning time, a channel viewing ending time, bandwidth consumed corresponding to a requested channel, a viewed program identification number, a likely viewer identification number, failed channel requests, additional programs viewed on a displayed channel when the displayed channel is displayed for longer than a single initial program length, advertisers displaying advertisements during viewed programs, subject matter associated with the viewed programs, product placement in the viewed programs, and targeted marketing information associated with the viewed programs and advertisements.

In an embodiment according to the present invention, the distribution unit may be adapted to communicate with each of the plurality of STBs one of via a wire or wirelessly. The distribution unit may comprise a plurality of transmission heads. Each of the transmission heads may comprise at least one of mechanical, electrical, and electronic switches and relays adapted to maintain continuous communication with each of the STBs at a plurality of end-user locations.

In an embodiment according to the present invention, the distribution unit may be adapted to communicate with each of the plurality of STBs via one of a wireless receiver, a wired receiver, a wireless transmitter, and a wired transmitter.

In an embodiment according to the present invention, the network may further comprise a subscriber database memory storing subscriber information for each of a plurality of end-user subscribers. The subscriber database memory may comprise at least one of a listing of channels subscribed, STB information, subscriber spending limits, subscriber personal information, and subscriber identity information for authentication.

In an embodiment according to the present invention, the STB may be adapted to permit a subscriber end-user may be enabled to unsubscribe to subscribed programming channels by selecting a corresponding response from an interactive menu displayed by an end-user STB on an end-user display apparatus. The selected response may be transmitted to a network component for processing.

In an embodiment according to the present invention, a subscriber end-user may be enabled to view information stored in a subscriber memory database corresponding to the subscriber end-user. The subscriber end-user may be enabled to view at least one of end-user preferences, subscription status, collected statistics, and viewing habits on a display apparatus on-demand. The information may be transmitted to an end-user STB from a network component.

In an embodiment according to the present invention, multimedia information may be communicated to the STB via one of a cable, an optical fiber, and wirelessly.

In an embodiment according to the present invention, the STB may be adapted to detect whether an end-user display apparatus is one of active and inactive. The STB may be adapted to transmit a message to the network. The message may indicate whether the display apparatus is one of active and inactive. Multimedia distribution may be terminated when it is determined that the display apparatus is inactive:

In an embodiment according to the present invention, detecting whether the end-user display apparatus is one of active and inactive may comprise evaluating at least one component of the end-user display apparatus.

In an embodiment according to the present invention, the STB may be adapted to determine whether an end-user is physically viewing transmitted multimedia information. Upon determining that the end-user is not physically viewing the transmitted multimedia information, the STB may transmit a message to the network indicating that the end-user is not physically viewing the multimedia information. Transmission of multimedia information may then be terminated.

In an embodiment according to the present invention, determining whether an end-user is physically viewing the transmitted multimedia information may comprise prompting the end-user to interact with the STB.

Aspects of the present invention may be found in a set-top-box (STB) adapted to request a multimedia channel from a multimedia distribution network. The STB may comprise a processor for processing and managing at least one of channel requests, bandwidth requested, and multimedia channel information. The STB may also comprise an audio decoder for decoding audio information received via an encoded multimedia channel transmission. The STB may also comprise a video decoder for decoding video information received via an encoded multimedia channel transmission. The STB may also comprise a data decoder for decoding data from one of the network and the Internet, a transmitter for transmitting channel requests to the multimedia distribution network, and a receiver for receiving multimedia channel information and messages associated with the channel requests.

In an embodiment according to the present invention, the STB may further comprise an antenna for wirelessly communicating with a multimedia distribution unit in the multimedia distribution network.

In an embodiment according to the present invention, the STB may further comprise a wired connection for communicating with a multimedia-distributing unit in the multimedia distribution network.

In an embodiment according to the present invention, the STB may further comprise a combination audio/video decoder unit. The combination audio/video decoder unit may comprise the audio decoder and the video decoder.

In an embodiment according to the present invention, the STB may further comprise a combination transmitter/receiver unit. The combination transmitter/receiver unit may comprise the transmitter and the receiver.

In an embodiment according to the present invention, the STB may be adapted to permit a subscriber end-user to unsubscribe to subscribed programming channels by selecting a corresponding response from an interactive menu displayed by the STB on an end-user display apparatus. The STB may transmit the corresponding response to a network component for processing.

In an embodiment according to the present invention, the STB may be adapted to permit a subscriber end-user to access and view information stored in a subscriber memory database corresponding to the subscriber end-user with the STB. The STB may be adapted to permit the subscriber end-user to view at least one of end-user preferences, subscription status, collected statistics, and viewing habits on a display apparatus on-demand. The information may be received by the STB from a network component.

In an embodiment according to the present invention, the multimedia information provider may communicate to the STB via one of a cable, an optical fiber, and wirelessly.

In an embodiment according to the present invention, the STB may be adapted to detect whether an end-user display apparatus is one of active and inactive. The STB may be adapted to transmit a message to the network. The message may indicate whether the display apparatus is one of active and inactive. Multimedia distribution may be terminated when it is determined that the display apparatus is inactive.

In an embodiment according to the present invention, detecting whether the end-user display apparatus is one of active and inactive may comprise evaluating at least one component of the end-user display apparatus.

In an embodiment according to the present invention, the STB may be adapted to determine whether an end-user is physically viewing transmitted multimedia information. Upon determining that the end-user is not physically viewing the transmitted multimedia information, the STB may transmit a message to the network indicating that the end-user is not physically viewing the multimedia information. Transmission of multimedia information may then be terminated.

In an embodiment according to the present invention, determining whether an end-user is physically viewing the transmitted multimedia information may comprise prompting the end-user to interact with the STB.

Aspects of the present invention may be found in a method of determining viewing habits of a plurality multimedia channel subscribers. The method may comprise monitoring multimedia usage by each of the plurality of multimedia channel subscribers. Monitoring multimedia usage may comprise monitoring channel requests received from each of a plurality of set-top-boxes (STBs), monitoring multimedia channel information transmitted to each of the plurality of multimedia channel subscribers and corresponding STBs, monitoring channel transmission beginning and ending times, monitoring bandwidth consumed for each channel viewed, storing monitored multimedia channel information, and analyzing the monitored multimedia channel information to determine subscriber viewing habits.

In an embodiment according to the present invention, storing monitored multimedia channel information may comprise creating a plurality of user logs of subscriber viewing activity in a use memory. Each of the plurality of user logs may correspond to one of a subscriber and multiple viewers at each end-user location.

In an embodiment according to the present invention, the user logs may comprise at least one of channel requests received, length of time of channel transmission, a channel identification number, a channel viewing beginning time, a channel viewing ending time, bandwidth consumed, a viewed program identification number, a likely viewer identification number, failed channel requests, additional programs viewed on a displayed channel when the displayed channel is displayed for longer than a single initial program length, advertisers displaying advertisements during viewed programs, subject matter associated with the viewed programs, product placement in the viewed programs, and targeted marketing information associated with the viewed programs.

In an embodiment according to the present invention, all of the channel requests for one of a particular channel and a particular subscriber from each of the plurality of user logs may be combined to create an aggregate entry stored in one of a corresponding channel log and a corresponding subscriber log.

In an embodiment according to the present invention, the method may further comprise comparing the monitored multimedia channel information against a program listing for channels and times to determine viewing habits of end-user subscribers. Determining viewing habits of end-user subscribers may comprise determining programs and corresponding subject matter of the programs subscribers request and view.

In an embodiment according to the present invention, the method may further comprise analyzing channel requests and corresponding multimedia channel transmission information to determine program information and end-user viewer information.

In an embodiment according to the present invention, the method may further comprise detecting whether a display apparatus at a corresponding end-user subscriber location is one of active and inactive, and terminating channel transmission upon determining that the display apparatus is inactive.

In an embodiment according to the present invention, the method may further comprise detecting whether a display apparatus at a corresponding end-user subscriber location is one of active and inactive, and transmitting a message indicating that the display apparatus at the corresponding end-user subscriber location is one of active and inactive.

In an embodiment according to the present invention, the method may further comprise detecting whether a display apparatus at a corresponding end-user subscriber location is one of active and inactive. Detecting may comprise evaluating at least one component of the display apparatus.

In an embodiment according to the present invention, the method may further comprise determining whether an end-user subscriber is viewing an active display apparatus at a corresponding end-user subscriber location. Determining may comprise prompting the end-user subscriber to interact with a corresponding STB.

In an embodiment according to the present invention, the method may further comprise determining whether an end-user subscriber is viewing an active display apparatus at a corresponding end-user subscriber location. Upon determining that the end-user subscriber is not viewing the active display apparatus, terminating channel transmission.

In an embodiment according to the present invention, the method may further comprise determining whether an end-user subscriber is viewing an active display apparatus at a corresponding end-user subscriber location, and transmitting a message indicating that the end-user subscriber is viewing the active display apparatus at the corresponding end-user subscriber location.

In an embodiment according to the present invention, the method may further comprise determining subscriber interests by evaluating subscriber viewing habits.

In an embodiment according to the present invention, the method may further comprise reducing total bandwidth transmitted to each subscriber by transmitting multimedia channel information selected by each subscriber independently.

In an embodiment according to the present invention, the method may further comprise increasing transmitted multimedia channel quality by increasing bandwidth transmitted for each requested multimedia channel selected by each subscriber independently.

In an embodiment according to the present invention, the method may further comprise target marketing each end-user subscriber with product information based upon analysis of end-user subscriber viewing habits and determination of end-user subscriber interests.

In an embodiment according to the present invention, the method may further comprise determining by analysis of subscriber viewing habits whether a subscriber is channel surfing.

In an embodiment according to the present invention, subscriber channel surfing may be determined by counting channel requests transmitted in a predetermined amount of time, and comparing the counted number of channel requests received in a predetermined amount of time with a predetermined number of channel requests. If the counted number of channel requests is greater than the predetermined number of channel requests, then the subscriber is determined to be channel surfing. A channel surfing entry in a user log may be created. A channel surfing entry in the user log may comprise at least starting and ending times of a channel surfing event.

In an embodiment according to the present invention, subscriber channel surfing may be determined by recording a length of viewing time associated with each channel request and comparing the length of viewing time with a predetermined time. If the length of viewing time is less than the predetermined time, then the subscriber is determined to be channel surfing. A channel surfing entry in a user log may be created. A channel surfing entry in the user log may comprise at least starting and ending times of a channel surfing event.

In an embodiment according to the present invention, the method may further comprise enabling the end-user subscriber to unsubscribe to subscribed programming channels by selecting a corresponding response from an interactive menu displayed by an end-user STB on an end-user display apparatus. The selected response may be transmitted to a network component for processing.

In an embodiment according to the present invention, the method may further comprise enabling the end-user subscriber to view information stored in a subscriber memory database corresponding to the subscriber end-user. The method may further comprise enabling the end-user subscriber to view at least one of end-user preferences, subscription status, collected statistics, and viewing habits on a display apparatus on-demand. The information may be transmitted to an end-user STB from a network component.

In an embodiment according to the present invention, the multimedia information provider may communicate to the STB via one of a cable, an optical fiber, and wirelessly.

These and other features and advantages of the present invention may be appreciated from a review of the following detailed description of the present invention, along with the accompanying figures in which like reference numerals refer to like parts throughout.

BRIEF DESCRIPTION OF SEVERAL VIEWS OF THE DRAWINGS

FIG. 4 is a block diagram illustrating a multimedia logging system in accordance with an embodiment of the present invention;

DETAILED DESCRIPTION OF THE INVENTION

Figure 1:
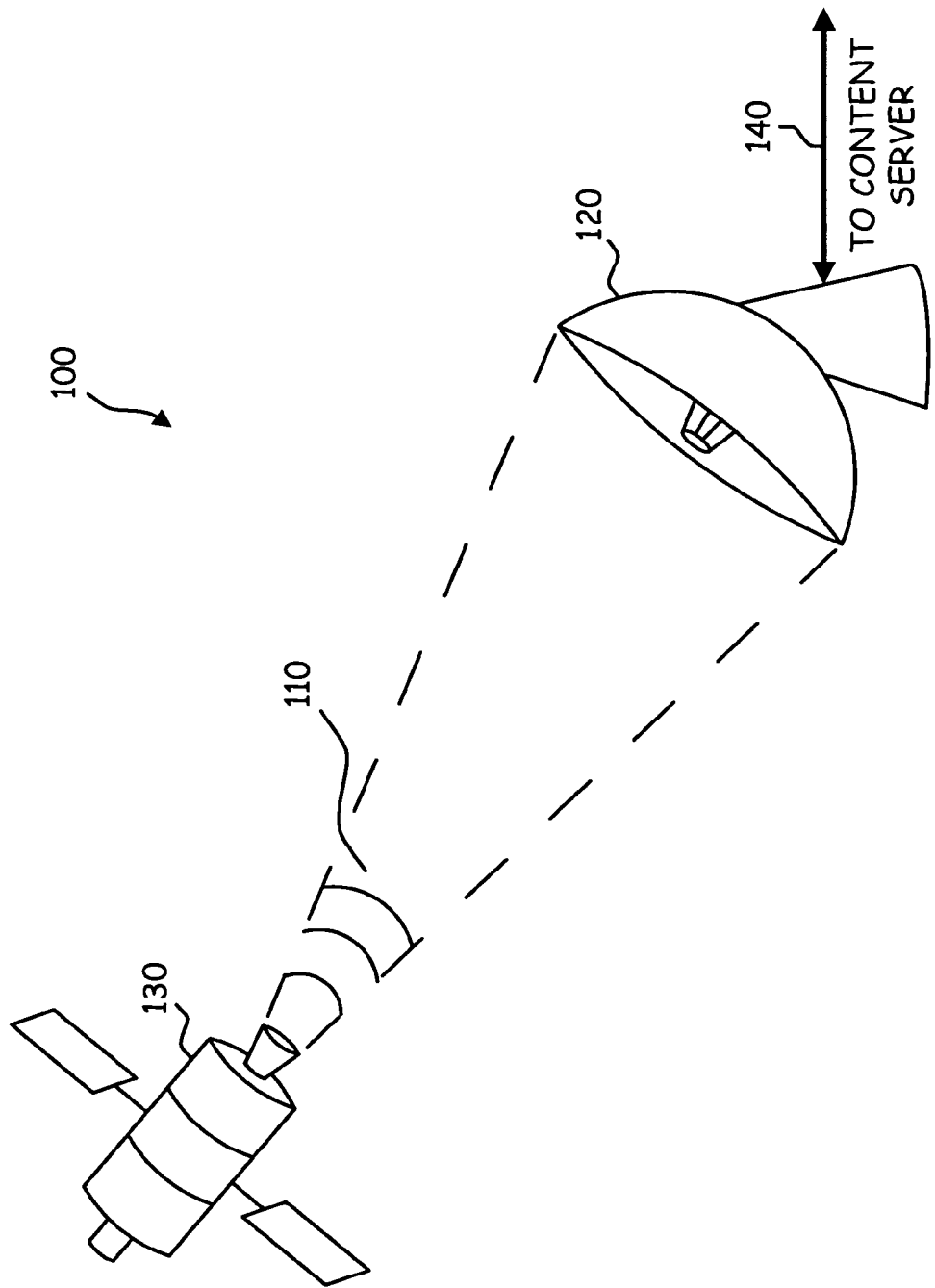
FIG. 1 is a perspective diagram illustrating a satellite transmission/reception system in accordance with an embodiment of the present invention.

FIG. 1 is a perspective diagram 100 illustrating a satellite transmission/reception system in accordance with an embodiment of the present invention. In FIG. 1, a satellite 130 is illustrated transmitting multimedia information 110 to a satellite receiver 120. The satellite receiver 120 may be located proximate a service provider location. The satellite receiver 120 may comprise of a receiving antenna and a tuner.

The service provider may comprise a cable television service provider, an Internet service provider, a radio service provider, and other multimedia service providers. The multimedia information received at the satellite receiver 120 may be conveyed to the service provider location via transmission cable 140. The multimedia information received at the satellite receiver 120 may also be conveyed to the service provider location via an optical fiber or wirelessly.

The satellite transmission/reception system illustrated in FIG. 1 may comprise a plurality of satellites 130 and a plurality of satellite receivers 120, wherein each satellite 130 may transmit a plurality of multimedia channels to corresponding satellite receivers 120.

In an embodiment according to the present invention, the plurality of satellite receivers may be located in a different geographic location from the service provider location(s). The plurality of satellite receivers may be arranged in an array, wherein each satellite receiver is pointed to and receives transmissions from a corresponding satellite.

At a satellite receiver array location, multimedia information for all channels that a service provider offers may be accumulated and encoded together for further satellite transmission to a plurality of remotely located respective service provider locations for further dissemination and distribution.

In accordance with an embodiment of the present invention, each of a plurality of multimedia transmissions may comprise a plurality of television channels, a plurality of radio channels, a plurality of Internet transmissions, etc. The plurality of multimedia transmissions may be conveyed to content servers at a plurality of service provider locations.

Figure 2:
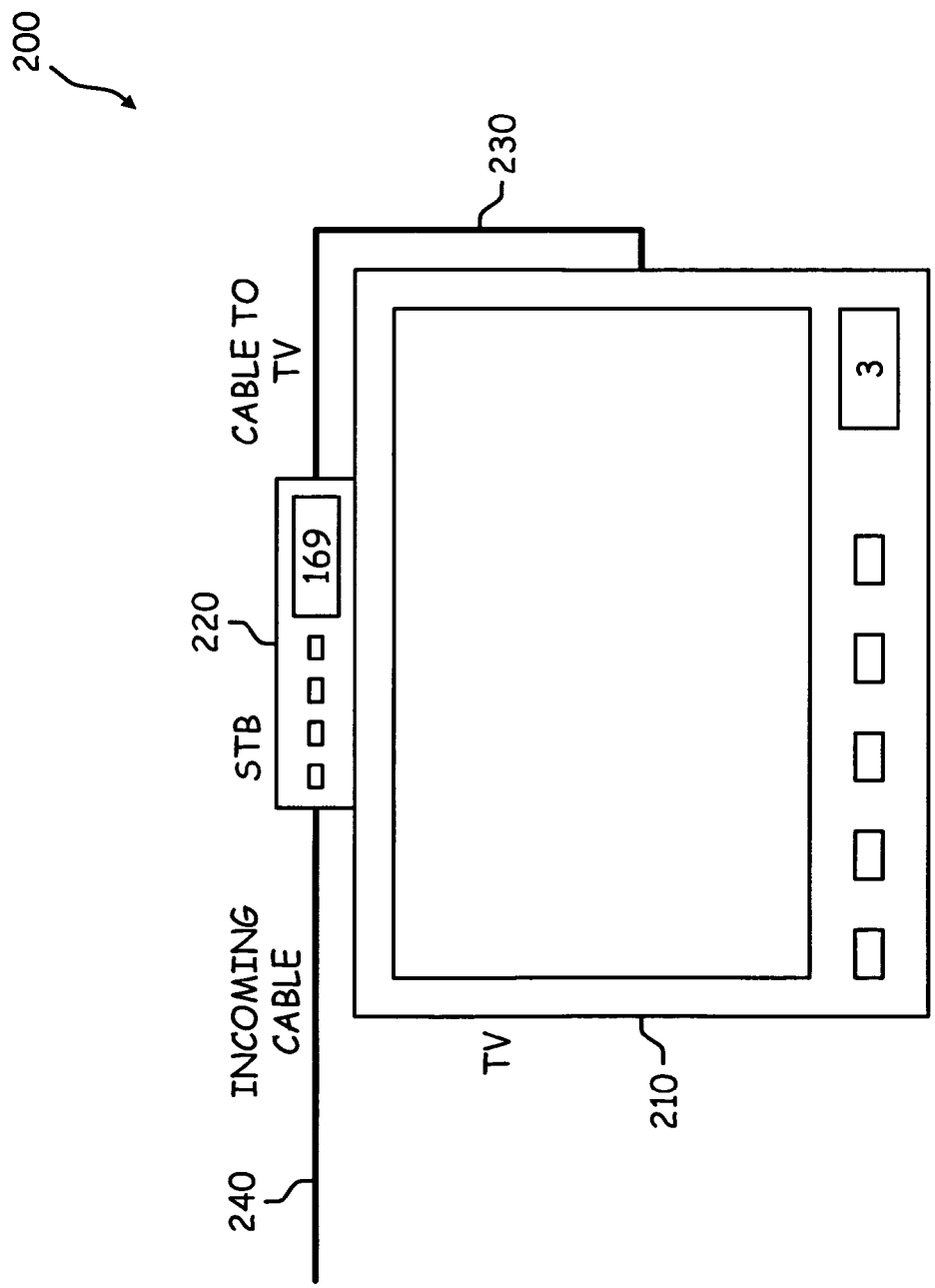
FIG. 2 is a perspective diagram illustrating multimedia display components at an end-user location in accordance with an embodiment of the present invention.

FIG. 2 is a perspective diagram 200 illustrating multimedia display components at an end-user location in accordance with an embodiment of the present invention. FIG. 2 illustrates a TV set 210 and an associated set-top-box (STB) 220. At the end-user location, a multimedia transmission may be received from an incoming cable 240. The incoming cable 240 may be directly or indirectly connected to a content server at a local service provider location.

The multimedia transmission transmitted through the incoming cable 240 may be received at STB 220. From the STB 220, another cable 230 may connect the STB 220 to the TV set 210. The multimedia transmission received at the end-user location comprises every channel available for displaying or viewing that the service provider offers, whether the channel is subscribed to or not.

The multimedia transmission, because of the vast amounts of information being transmitted, (i.e., every channel the service provider offers), has a very large bandwidth. However, at an individual television set, for example, TV set 210, an end-user may only be able to watch at most 2 channels, assuming that the TV set 210 is adapted to provide picture-in-picture (PIP) display.

Assuming that the multimedia transmission received at the end-user location comprises 600 to 1000 individual channels capable of being subscribed and viewed, being simultaneously transmitted, then even if the end-user watches 2 channels at once via PIP display, more than 99% of the bandwidth and multimedia information being transmitted is wasted (not viewed).

In an embodiment according to the present invention, only the multimedia information that the end-user requests is transmitted to the end-user. For example, if the end-user selects a channel to view, and the end-user is subscribed to the selected channel, then when the end-user selects the channel on the STB 220 to view, the STB 220 transmits a request for the multimedia information associated with that channel to the content server located at a geographically proximate (local) service provider location. In response to the channel request, the content server may initiate transmission of the multimedia information associated with the selected channel.

The STB 220 may also be adapted to determine whether the end-user is subscribed to the requested channel prior to sending the channel transmission request.

In an embodiment according to the present invention, the STB 220 may send the request to the content server, wherein the content server may be adapted to determine whether the end-user is subscribed to the requested channel.

If the end-user is subscribed to the selected channel, as determined by either the STB 220 or the local service provider's content server, then in response to the channel request, the content server may initiate transmission of the multimedia information associated with the selected channel.

If the end-user is not subscribed to the selected channel, then either the STB 220 or the local service provider's content server may cause a message to be displayed upon the TV set 210 informing the end-user that the selected channel has not been subscribed and is not currently authorized for viewing. The end-user may be prompted to initiate subscription or pay for viewing the selected channel (such as for example, pay-per-view PPV).

In another embodiment according to the present invention, if the end-user chooses to view two different channels at once, by activating the PIP function on the TV set, the STB 220 may request transmission of both selected channels from the content server at the local service provider location.

In an embodiment according to the present invention, the amount of information being transmitted to a particular end-user is significantly reduced over prior transmission methods. Prior transmission methods comprise transmitting every channel that the service provider offers simultaneously to every end-user, resulting in wasted bandwidth and transmission of unwanted and un-requested information.

Because the amount of multimedia information being transmitted in an embodiment according to the present invention is significantly reduced, the bandwidth used to perform the transmission is also significantly reduced. Cable theft may be significantly reduced, if not totally eliminated by sending only the multimedia information requested by an end-user, by authentication of the end-user, by securing the communication via encryption/decryption of the multimedia content by derived session keys, by changing the session keys frequently, and by authenticating subscribed services according to an embodiment of the present invention.

Figure 3:
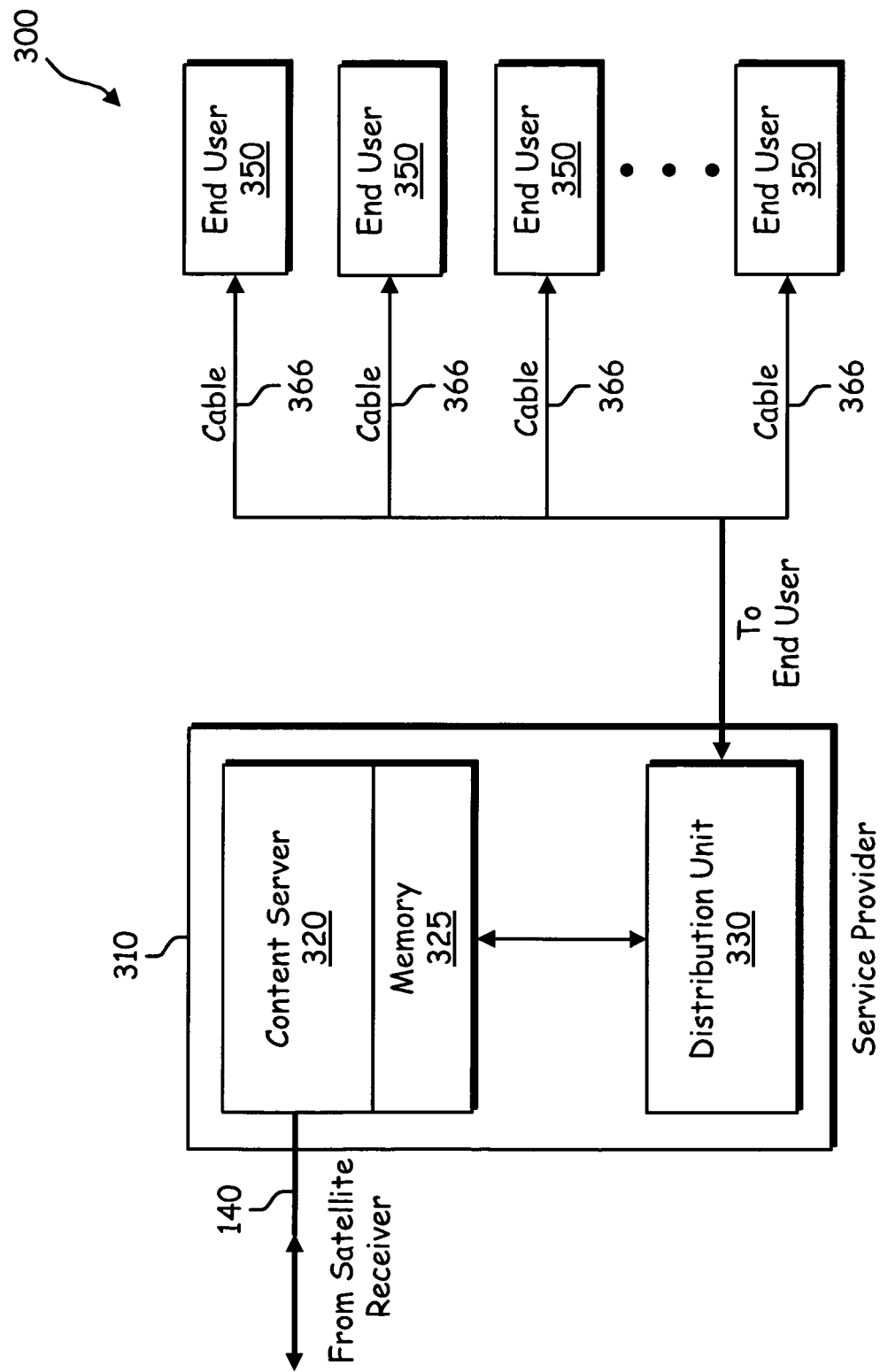
FIG. 3 is a block diagram illustrating a multimedia distribution network in, accordance with an embodiment of the present invention.

FIG. 3 is a block diagram illustrating a multimedia distribution network 300 in accordance with an embodiment of the present invention. The multimedia distribution network 300 illustrated in FIG. 3 may comprise a local service provider system 310. The local service provider system 310 may comprise at least a content server 320 and a distribution unit 330. The content server 320 may receive the plurality of multimedia transmissions via transmission cable 140 from a satellite receiver, for example, satellite receiver 120 as illustrated in FIG. 1. The content server 320 may also receive the plurality of multimedia transmissions via an optical fiber or wirelessly from a satellite receiver.

The content server 320 may comprise a storage unit memory 325 for receiving and storing multimedia transmission information. The content server 320 may also be adapted to provide on-demand access to streaming media transmissions (channels) being received from the satellite receiver 120. The content server 320 may be adapted to validate and authorize channel requests received from the plurality of end-users locations 350. The content server 320 may also be adapted to authenticate end-user STBs and derive session keys (encryption/decryption) to secure the communication.

In an embodiment according to the present invention, a channel may be selected for viewing at an end-user location 350. The end-user's STB 220, for example, as illustrated in FIG. 2, may transmit a channel request via cable 366 to the service provider location 310. The channel request may be received at a distribution unit 330 which may convey the request to the content server 320. Alternatively, the channel request may be received at the content server 320.

Figure 3A:
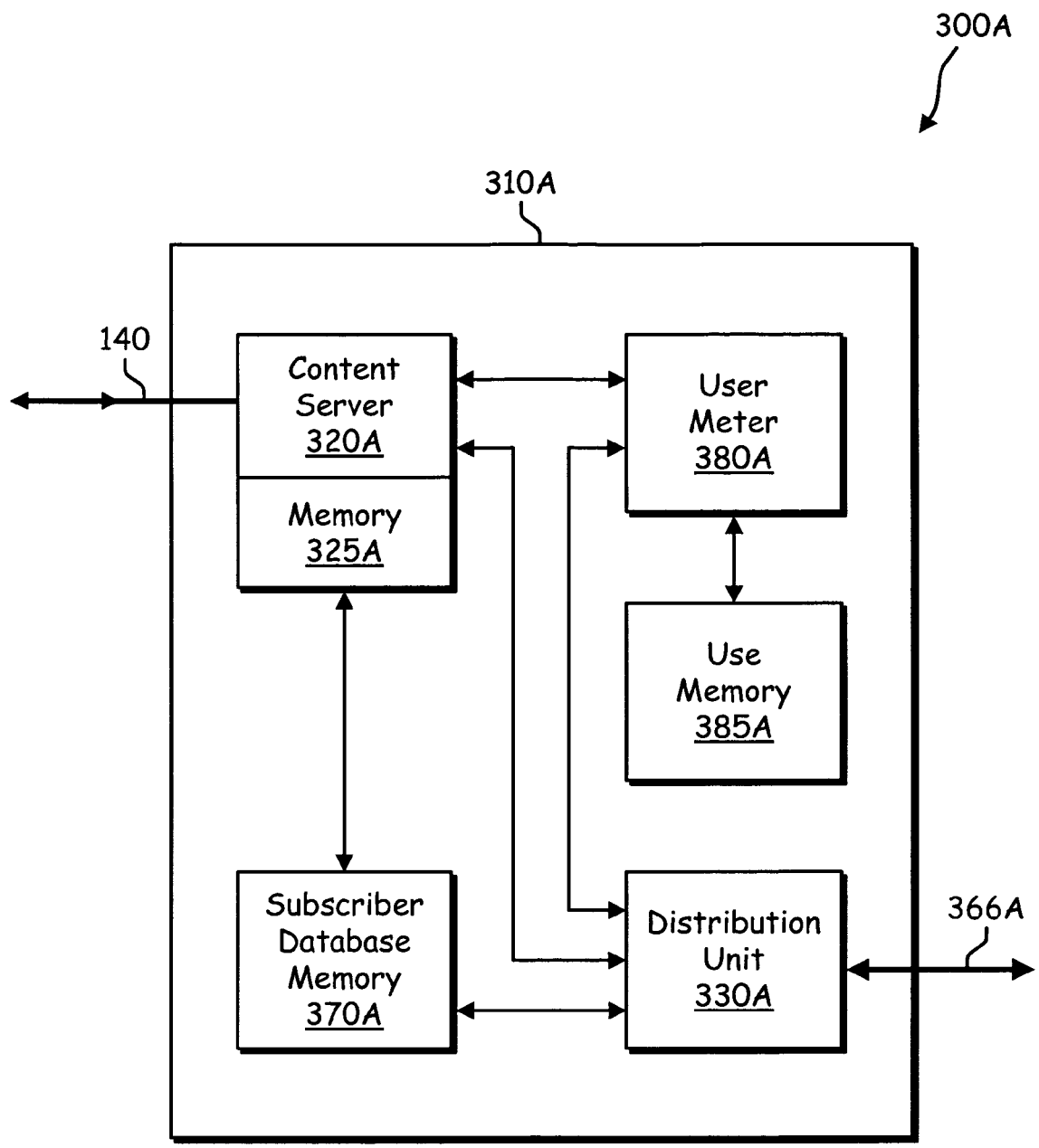
FIG. 3A is a block diagram illustrating a multimedia distribution and metering system in accordance with an embodiment of the present invention.

FIG. 3A is a block diagram illustrating a multimedia distribution and metering system 300A in accordance with an embodiment of the present invention. The multimedia distribution and metering system 300A illustrated in FIG. 3A may comprise a local service provider system 310A. The local service provider system 310A may comprise at least a content server 320A and a distribution unit 330A. The content server 320A may receive the plurality of multimedia transmissions via transmission cable 140 from a satellite receiver, for example, satellite receiver 120 as illustrated in FIG. 1. The content server 320A may also receive the plurality of multimedia transmissions via an optical fiber or wirelessly from a satellite receiver.

The content server 320A may comprise a storage unit memory 325A for receiving and storing multimedia transmission information. The content server 320A may also be adapted to provide on-demand access to streaming media transmissions (channels) being received from the satellite receiver 120.

The content server 320A may be adapted to validate and authorize channel requests received from the plurality of end-users locations 350 by accessing a subscriber database memory 370A. The subscriber database memory 370A may comprise end-user STB information, end-user channel subscription information, end-user spending limit information, end-user blocked channel information, end-user identity information for authentication, etc.

In an embodiment according to the present invention, as illustrated in FIG. 3, a channel may be selected for viewing at an end-user location 350. The end-user's STB 220, for example, as illustrated in FIG. 2, may transmit a channel request via cable 366A to the service provider location 310A. The channel request may be received at a distribution unit 330A, which may convey the request to the content server 320A. Alternatively, the channel request may be received directly at the content server 320A.

The content server 320A may process the channel request. Processing the channel request at the content server 320A may comprise analyzing and evaluating the channel request. Analyzing and evaluating the channel request may comprise determining from the channel request end-user STB information, etc., and thus, the associated information related to the end-user requesting the channel.

The channel request may be compared with a database of subscriber information 370A, wherein if it is determined that channel is subscribed the channel request is initiated. Initiation of the channel request may comprise transmitting the requested channel multimedia information to the STB 220 at the end-user location 350.

If it is determined that the channel is not subscribed, the content server 320A may transmit a message to the STB 220 informing the end-user that the channel requested is not subscribed and authorized for viewing. The transmitted message may also comprise a prompt to cause the end-user to subscribe to the channel and/or pay for viewing the channel, such as pay per view (PPV).

In an embodiment according to the present invention, the content server may transmit a message to the STB informing the end-user that the selected channel is not available for access, for example, because the channel is unavailable from the satellite or the channel is restricted for select end-users only.

In another embodiment, the content server 320A may authenticate the STB after power-on. Similarly the authentication process may be initiated by the STB after power-on. The content server and the STBs may derive separate session keys in frequent time intervals in order to encrypt/decrypt the contents of future communications and multimedia data. Encryption/decryption may also prevent cable theft.

The distribution unit 330A may comprise a plurality of transmission heads. The transmission heads may comprise switches or relays of mechanical, electrical, electronic or any other forms adapted to maintain continuous communication with the STB 220 at end-user location 350.

Maintaining continuous communication may also comprise metering of multimedia usage by the plurality of end-users. The metering may be performed by a use meter 380A in the service provider location 310A. The use meter 380A may monitor end-users' channel selections time of viewing information and the bandwidth consumed for the channel viewed by the end-user.

The monitored information may be stored in a use memory 385A, wherein end-user viewing habits may be evaluated and analyzed to provide an accurate and individualized or group survey of multimedia viewership, as discussed below.

The use meter 380A may be connected to the distribution unit 370A for monitoring the multimedia information distributed to the end-users 350. The use meter 380A may also be connected to the content server 320A.

In an embodiment according to the present invention, a method of usage based metering may be performed. The method may comprise receiving a channel request from a STB 220 at an end-user location 350. The channel request may be received at distribution unit 330A or content server 320A. Channel request information may be metered by use meter 380A and stored in use memory 385A.

In an embodiment according to the present invention, the network 300A may further comprise subscriber database memory 370A storing subscriber information for each of a plurality of end-user subscriber locations 350. The subscriber database memory 370A may comprise at least one of a listing of channels subscribed, STB information, subscriber spending limits, subscriber personal information, and subscriber identity information for authentication.

In an embodiment according to the present invention, the STB 220 may be adapted to permit a subscriber end-user may be enabled to unsubscribe to subscribed programming channels by selecting a corresponding response from an interactive menu displayed by an end-user STB 220 on an end-user display apparatus 210. The selected response may be transmitted to a network component for processing.

In an embodiment according to the present invention, the STB 200 may be adapted to permit a subscriber end-user to view information stored in a subscriber memory database 370A corresponding to the subscriber end-user location 350. The subscriber end-user may be enabled by the STB 220 to view at least one of end-user preferences, subscription status, collected statistics, and viewing habits on a display apparatus on-demand. The information may be transmitted to the end-user STB 220 from a network component, for example, content server 320A.

In an embodiment according to the present invention, multimedia information may be communicated to the STB 220 via one of a cable, an optical fiber, and wirelessly.

In an embodiment according to the present invention, the STB 220 may be adapted to detect whether an end-user display apparatus 210 is one of active and inactive. The STB 220 may be adapted to transmit a message to the network. The message may indicate whether the display apparatus 210 is one of active and inactive. Multimedia distribution may be terminated when it is determined that the display apparatus 210 is inactive.

In an embodiment according to the present invention, detecting whether the end-user display apparatus 210 is one of active and inactive may comprise evaluating at least one component of the end-user display apparatus 210.

In an embodiment according to the present invention, the STB may be adapted to determine whether an end-user is physically viewing transmitted multimedia information. Upon determining that the end-user is not physically viewing the transmitted multimedia information, the STB 220 may transmit a message to the network 300A indicating that the end-user is not physically viewing the multimedia information. Transmission of multimedia information may then be terminated.

In an embodiment according to the present invention, determining whether an end-user is physically viewing the transmitted multimedia information may comprise prompting the end-user to interact with the STB 220. Interacting with the STB 220 may comprise prompting the end-user to press a button on a remote control device indicating a desire to continue transmission of the multimedia content.

Figure 3B:
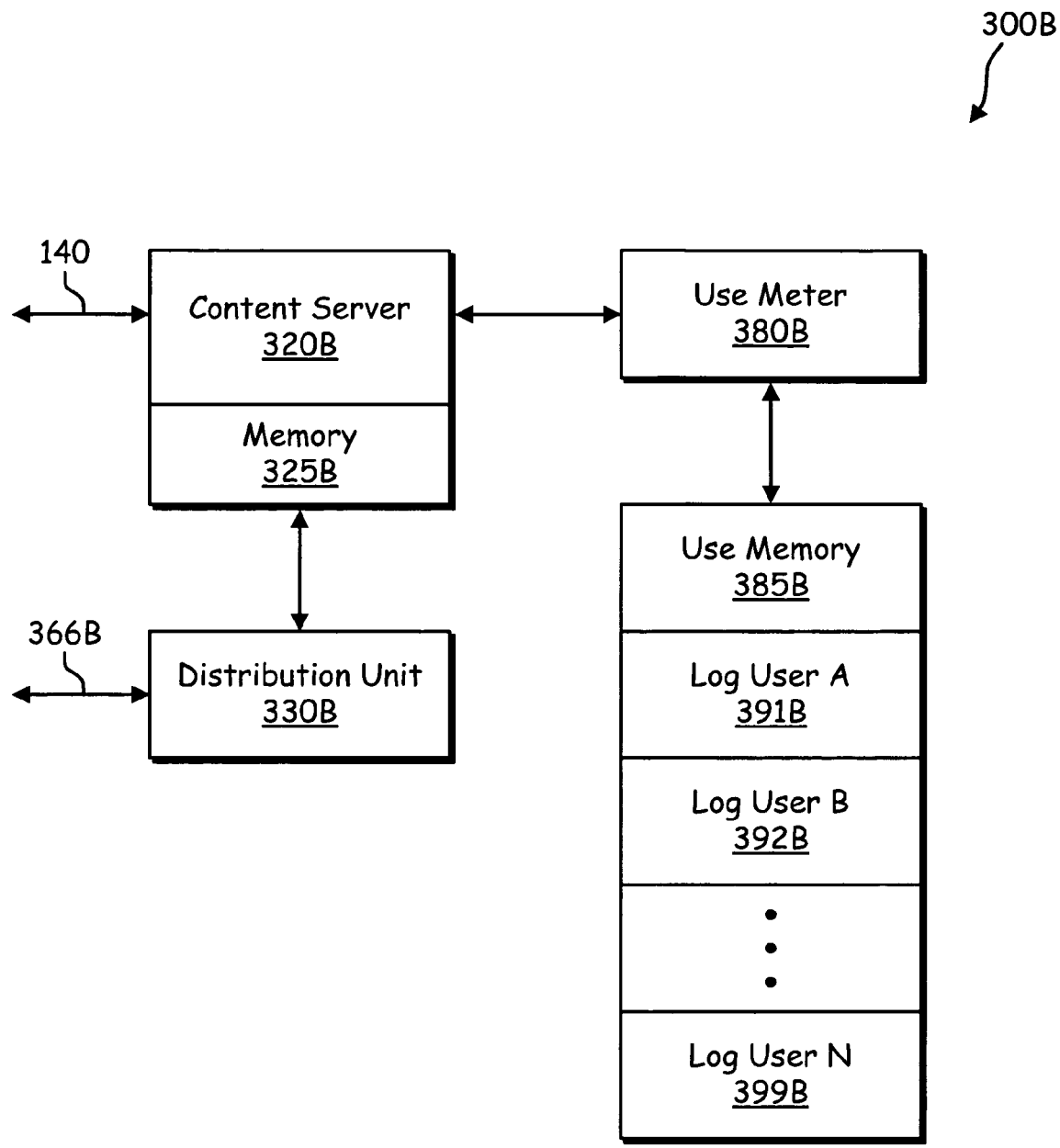
FIG. 3B is a block diagram illustrating a multimedia distribution and metering system in accordance with an embodiment of the present invention.

FIG. 3B is a block diagram illustrating a multimedia distribution and metering system 300B in accordance with an embodiment of the present invention. The multimedia distribution and metering system 300B illustrated in FIG. 3B may comprise at least a content server 320B and a distribution unit 330B. The content server 320B may receive the plurality of multimedia transmissions via transmission cable 140 from a satellite receiver, for example, satellite receiver 120 as illustrated in FIG. 1.

The content server 320B may comprise a storage unit memory 325B for receiving and storing multimedia transmission information. The content server 320B may also be adapted to provide on-demand access to streaming media transmissions (channels) being received from the satellite receiver 120.

The content server 320B may be adapted to validate and authorize channel requests received from the plurality of end-users 350 (illustrated in FIG. 3) by accessing a subscriber database memory 370A (illustrated in FIG. 3A).

In an embodiment according to the present invention, an end-user 350, as illustrated in FIG. 3, may select a channel for viewing. The end-user's STB 220, for example, as illustrated in FIG. 2, may transmit a channel request via cable 140 to the content server 320B.

The content server 320B may process the channel request. Processing the channel request at the content server 320B may comprise analyzing and evaluating the channel request. Analyzing and evaluating the channel request may comprise determining from the channel request end-user STB information, etc., and thus, the associated information related to the end-user requesting the channel.

The channel requested may be transmitted to the STB 220 at the end-user location 350. Metering may be performed by a use meter 380B. The use meter 380B may monitor end-users' channel selections, time of viewing information and the bandwidth consumed.

The monitored information may be stored in a use memory 385B, the use memory 385B comprising a plurality of user logs, for example, log user A 391B, log user B 392B, and log user N 399B, wherein end-user viewing habits may be stored. The metered use may be evaluated and analyzed to provide an accurate and individualized or group survey of multimedia viewership. The use meter 380B may communicatively coupled to content server 320B.

In an embodiment according to the present invention, a method of usage based metering may be performed. The method may comprise receiving a channel request from a STB 220 at an end-user location 350. The channel request may be received at content server 320B. Channel request information may be metered by use meter 380B and stored in use memory 385B in a user log corresponding to the channel request.

In an embodiment according to the present invention, the network 300B may further comprise subscriber database memory 370A storing subscriber information for each of a plurality of end-user subscriber locations 350. The subscriber database memory 370A may comprise at least one of a listing of channels subscribed, STB information, subscriber spending limits, subscriber personal information, and subscriber identity information for authentication.

In an embodiment according to the present invention, the STB 220 may be adapted to permit a subscriber end-user may be enabled to unsubscribe to subscribed programming channels by selecting a corresponding response from an interactive menu displayed by an end-user STB 220 on an end-user display apparatus 210. The selected response may be transmitted to a network component for processing.

In an embodiment according to the present invention, the STB 200 may be adapted to permit a subscriber end-user to view information stored in a subscriber memory database 370A corresponding to the subscriber end-user location 350. The subscriber end-user may be enabled by the STB 220 to view at least one of end-user preferences, subscription status, collected statistics, and viewing habits on a display apparatus on-demand. The information may be transmitted to the end-user STB 220 from a network component, for example, content server 320A.

In an embodiment according to the present invention, multimedia information may be communicated to the STB 220 via one of a cable, an optical fiber, and wirelessly.

In an embodiment according to the present invention, the STB 220 may be adapted to detect whether an end-user display apparatus 210 is one of active and inactive. The STB 220 may be adapted to transmit a message to the network. The message may indicate whether the display apparatus 210 is one of active and inactive. Multimedia distribution may be terminated when it is determined that the display apparatus 210 is inactive.

In an embodiment according to the present invention, detecting whether the end-user display apparatus 210 is one of active and inactive may comprise evaluating at least one component of the end-user display apparatus 210.

In an embodiment according to the present invention, the STB 220 may be adapted to determine whether an end-user is physically viewing transmitted multimedia information.

Upon determining that the end-user is not physically viewing the transmitted multimedia information, the STB 220 may transmit a message to the network 300A indicating that the end-user is not physically viewing the multimedia information. Transmission of multimedia information may then be terminated.

In an embodiment according to the present invention, determining whether an end-user is physically viewing the transmitted multimedia information may comprise prompting the end-user to interact with the STB 220. Interacting with the STB 220 may comprise prompting the end-user to press a button on a remote control device indicating a desire to continue transmission of the multimedia content.

FIG. 4 is a block diagram 400 illustrating a multimedia logging system in accordance with an embodiment of the present invention. In FIG. 4, an individual end-user's multimedia viewing user log 470 is illustrated. The user log may comprise a plurality of memory locations, wherein each of the memory locations are illustrated in FIG. 4 as a square or rectangle containing a number.

In an embodiment according to the present invention, user log 470 may be used to define an end-user's multimedia viewing habits. The user log 470 may correspond to a single STB/TV set display system, wherein if an end-user has multiple STBs and associated TV sets each receiving multimedia information, each of the end-user display systems may be monitored and metered via a separate user log 470. In an embodiment according to the present invention, each of the end-user STB/TV set displays systems may be logged and metered in a sub-log of a subscriber log, wherein an end-user subscriber's display system network may be logged in sub-logs for later evaluation.

A user log 470 of end-user viewing activity may be created in the use memory 385B. The user log 470 may comprise channel requests received from end-users' STBs and length of time channel was being transmitted, for example. The user log 470 may be created and stored in the use memory 385B. The information stored in the user log 470 may be compared against a program listing for the requested channels and times to refine evaluation of the viewing habits of end-users. The viewing habit information may be used to determine programming choices to add and programming choice to eliminate. The viewing habit information may also be used to target the end-user for marketing and product purchase incentives.

The user log 470, as illustrated in FIG. 4, may comprise a plurality of columns and rows, for purposes of explanation. Wherein the rows may comprise a channel request and viewing information corresponding to a particular time interval or viewing period. The columns may comprise detailed viewing information, wherein the viewing information may be numerically coded for ease of processing.

Column 410, row 1, may comprise the channel number being requested and displayed. The first entry in column 410 comprise the number 0005, which may correspond to channel 5, a NBC affiliate, for example.

Column 420, row 1, may comprise a viewing beginning time. The first entry in column 420 may comprise the number 03220610, for example, which may correspond to March 22 at 6:10 in the morning.

Column 430, row 1, may comprise a viewing ending time. The first entry in column 430 may comprise the number 03220714, which may correspond to March 22 at 7:14 in the morning.

Column 440, row 1, may comprise a program identification number. The first entry in column 440 may comprise the number 120481, which may correspond to a local news program.

Column 450, row 1 comprises an ellipsis indicating at a plurality of additional information may be stored in a plurality of additional memory locations. For example, additional information may comprise information regarding additional programs viewed on the displayed channel when the channel is displayed for longer than a single initial programs length, advertisers displaying advertisements during the viewed program(s), subject matter associated with the viewed program(s), product placement in the viewed program(s), targeted marketing information associated with the viewed program(s), bandwidth consumed, etc.

Column 460, row 1, may comprise a likely viewer(s) identification number. The first entry in column 460 may comprise the number 99, which may correspond to an entire family viewing the program.

The first entry in column 410, row 2, may comprise the number 0127, which may correspond to channel 127, Cartoon Network, for example.

The first entry in column 420, row 2 may comprise the number 03220714, for example, which may correspond to March 22 at 7:14 in the morning. This may also correspond to the time when a new channel request was received and the new channel displayed.

The first entry in column 430, row 2 may comprise the number 03221830, which may correspond to March 22 at 6:30 in the evening. This may indicate that the cartoon channel was being received and viewed on the display apparatus nearly all day until 6:30 in the evening.

The first entry in column 440, row 2 may comprise the number 111410, which may correspond to a cartoon program.

Column 450, row 2 also comprises an ellipsis indicating at a plurality of additional information may be stored in a plurality of additional memory locations as set forth above.

The first entry in column 460, row 2 may comprise the number 03, which may correspond to children viewing the program(s).

The first entry in column 410, row 3, may comprise the number 0641, which may correspond to channel 641, the broadcast of a professional hockey game, for example.

The first entry in column 420, row 3 may comprise the number 03221830, for example, which may correspond to March 22 at 6:30 in the evening. This may also correspond to the time when a new channel request was received and the new channel displayed.

The first entry in column 430, row 3 may comprise the number 03222230, which may correspond to March 22 at 9:30 in the evening. This may indicate that the professional hockey game was being received and viewed on the display apparatus from 6:30 until 9:30 in the evening.

The first entry in column 440, row 3 may comprise the number 367414, which may correspond to the professional hockey game program.

Column 450, row 3 also comprises an ellipsis indicating at a plurality of additional information may be stored in a plurality of additional memory locations, as set forth above.

The first entry in column 460, row 3 may comprise the number 99, which may again correspond to the entire family viewing the professional hockey game program.

The first entry in column 410, row 4, may comprise the number 0002, which may correspond to channel 2, the broadcast of a Columbia Broadcasting System (CBS) network affiliate, for example.

The first entry in column 420, row 4 may comprise the number 03222230, for example, which may correspond to March 22 at 10:30 in the evening. This may also correspond to the time when a new channel request was received and the new channel displayed.

The first entry in column 430, row 4 may comprise the number 03230615, which may correspond to March 23 at 6:15 in the morning. This may indicate that the CBS network affiliate was being received and viewed on the display apparatus until 6:15 in the morning. As is often the case, end-users may leave the STB on all of the time. The end-users may turn of the TV set, but may leave the STB on over night. In the absence of any further channel requests in the evening, it may be difficult to determine how long an end-user may have been viewing the channel, if the channel was viewed at all.

In an embodiment according to the present invention, the STB may be adapted to detect whether an end-user display apparatus is one of active and inactive. The STB may be adapted to transmit a message to the network. The message may indicate whether the display apparatus is one of active and inactive. Multimedia distribution may be terminated when it is determined that the display apparatus is inactive.

In an embodiment according to the present invention, detecting whether the end-user display apparatus is one of active and inactive may comprise evaluating at least one component of the end-user display apparatus.

In an embodiment according to the present invention, the STB may be adapted to determine whether an end-user is physically viewing transmitted multimedia information. Upon determining that the end-user is not physically viewing the transmitted multimedia information, the STB may transmit a message to the network indicating that the end-user is not physically viewing the multimedia information. Transmission of multimedia information may then be terminated.

In an embodiment according to the present invention, determining whether an end-user is physically viewing the transmitted multimedia information may comprise prompting the end-user to interact with the STB. Interacting with the STB may comprise prompting the end-user to press a button on a remote control device indicating a desire to continue transmission of the multimedia content.

The first entry in column 440, row 4 may comprise the number 009462, which may correspond to a local news program, for example.

Column 450, row 4 also comprises an ellipsis indicating at a plurality of additional information may be stored in a plurality of additional memory locations, as set forth above.

The first entry in column 460, row 4 may comprise the number 11, which may correspond to adults/parents viewing the local news program.

The entirety of row 5 comprises a plurality of ellipsis indicating that the user log 470 may continue to meter and record/log the information being received and displayed at the end-user display system.

In the event that an end-user is continually changing channels, (i.e., channel surfing), the use meter may be programmed to ignore channel display events lasting less than a predetermined amount of time, for example, more than a few seconds.

In an embodiment according to the present invention, by ignoring channel surfing display events, the user log may be filled with information useful in developing marketing strategies for individual and collective end-users.

The first entry in column 410, tow 6, may comprise the number 0012, which may correspond to channel 12, the broadcast of a 20$^{th}$ Century FOX (FOX) network affiliate, for example.

The first entry in column 420, row 6 may comprise the number 03231800, for example, which may correspond to March 23 at 6:00 in the evening. This may also correspond to the time when a new channel request was received and the new channel displayed.

The first entry in column 430, row 6 may comprise the number 03231830, which may correspond to March 23 at 6:30 in the evening.

The first entry in column 440, row 6 may comprise the number 782472, which may correspond to "The Simpsons" animated comedy program, for example.

Column 450, row 6 also comprises an ellipsis indicating at a plurality of additional information may be stored in a plurality of additional memory locations, as set forth above.

The first entry in column 460, row 6 may comprise the number 99, which may correspond to the entire family viewing the animated comedy program.

The user log may be a memory of mechanical, electrical, electronic, magnetic, optical, chemical or any other available memory technology. The rows and columns of user log 470 may also be implemented as per the memory technology.

Figure 4A:
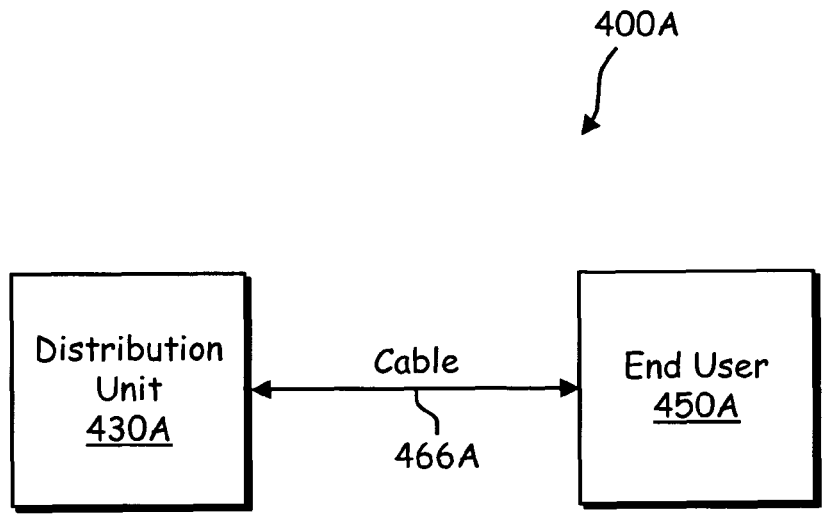
FIG. 4A is a block diagram illustrating a cable multimedia distribution network in accordance with an embodiment of the present invention.

FIG. 4A is a block diagram illustrating a cable multimedia distribution network 400A in accordance with an embodiment of the present invention. FIG. 4A illustrates a wired multimedia distribution network 400A. In the wired multimedia network 400A, according to an embodiment of the present invention, each respective end-user 450A may connected (hard wired) to a transmission head of the distribution unit 430A at the local service provider location via a cable 466A. The wired communication medium may be but not limited to Analog RF, Ethernet, etc.

Figure 4B:
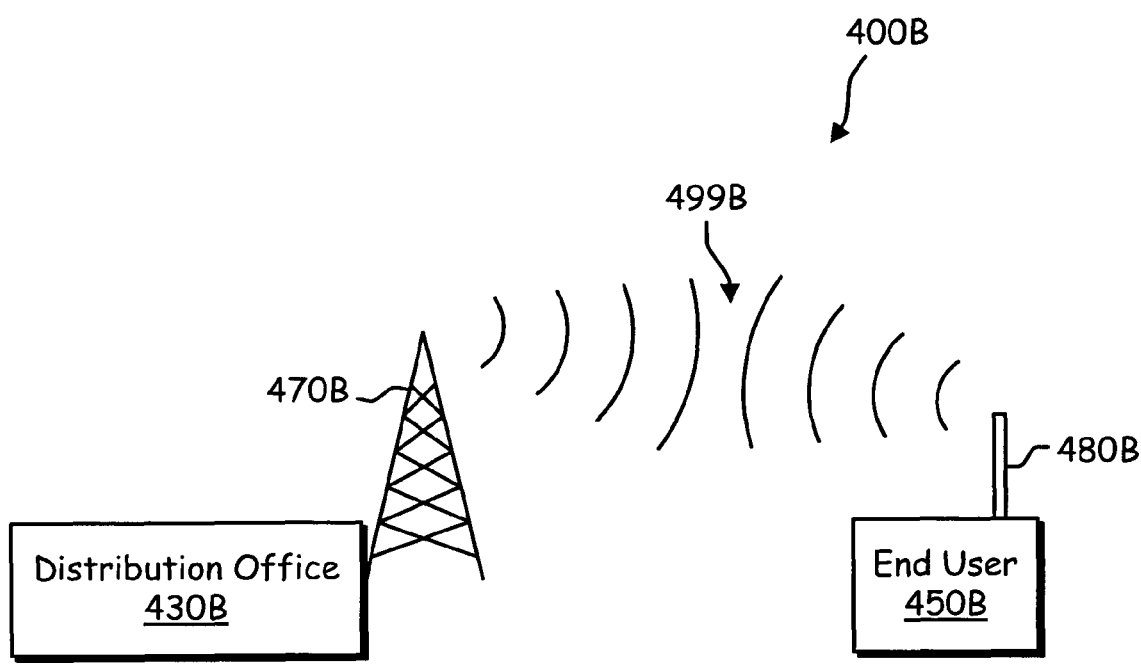
FIG. 4B is a block diagram illustrating a wireless multimedia distribution network in accordance with an embodiment of the present invention.

FIG. 4B is a block diagram illustrating a wireless multimedia distribution network 400B in accordance with an embodiment of the present invention. FIG. 4B illustrates a wireless multimedia distribution network 400B.

In the wireless multimedia network 400B, according to an embodiment of the present invention, each respective end-user 450B may be wirelessly connected to a transmission head of the distribution unit in distribution office 430B at the local service provider location via over-the-air (OTA) transmissions 499B. The wireless communication medium may be but not limited to Institute of Electrical and Electronics Engineers (IEEE) 802.11 Wireless local area network (LAN) standard, Bluetooth, code division multiple access (CDMA), Global System for Mobile Communications (GSM), WiMax, etc.

In an embodiment according to the present invention, the bandwidth and multimedia information being transmitted from the distribution office 430B to each individual end-user 450B has been significantly reduced in comparison to prior multimedia distribution systems.

In an embodiment according to the present invention, instead of transmitting every channel that the multimedia service provider offers to every individual end-user 450B, only the selected multimedia information or selected channel is transmitted to the individual end-users 450B. The significant reduction in bandwidth being transmitted makes it possible to transmit the multimedia information wirelessly over-the-air (OTA) instead of using a cable.

In an embodiment according to the present invention, the distribution office may be provided with a transmission tower 470B. The transmission tower 470B may be adapted to transmit individualized multimedia information, (i.e., a selected channel) to each individual end-user's STB. Each STB at each end-user location 450B may also be provided with an antenna 480B.

Figure 5:
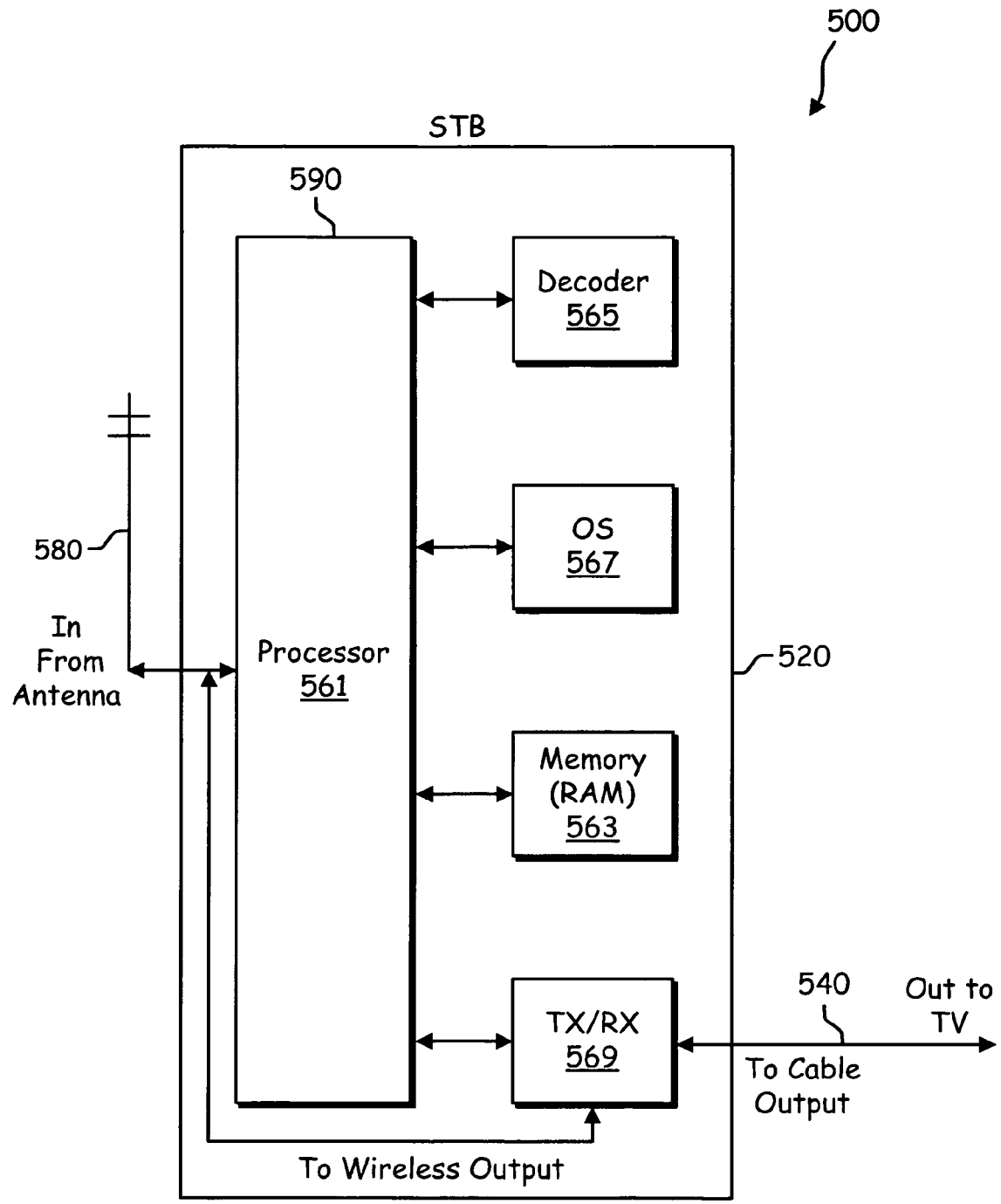
FIG. 5 is a block diagram illustrating a set-top-box multimedia unit in accordance with an embodiment of the present invention.

FIG. 5 is a block diagram 500 illustrating a wireless set-top-box (STB) multimedia unit in accordance with an embodiment of the present invention. FIG. 5 illustrates a wireless STB 520 according to an embodiment of the present invention. STB 520 may comprise an antenna 580 for communicating with a wireless multimedia distribution office.

The wireless STB 520 may also at least comprise a processor 561, a random access memory 563, an audio/video decoder 565, an operating system 567, and a combination transmitter/receiver 569. The wireless STB 520 may also comprise a cable output 540 providing transmission of the received decoded multimedia information to a TV set or another display apparatus. The output 540 may also be wireless for communicating with wireless enabled TVs or other wireless enabled display apparatus.

In an embodiment according to the present invention, an end-user may select to view a channel. The end-user selection may be made remotely via a remote control device, wherein the end-user may enter a channel number remotely selecting the channel at the wireless STB 520. The wireless STB 520, in response to the end-user channel selection may determine whether the end-user is subscribed and authorized to view the selected channel.

In another embodiment according to the present invention, in response to the end-user channel selection the STB 520 may inform the user selection to the content server or the distribution unit. The content server or the distribution unit then determines whether the end-user is subscribed and authorized to view the selected channel and convey the same to the STB 520.

If the end-user is not subscribed or authorized to view the selected channel, then the wireless STB may cause a message to be displayed at the TV set informing the end-user that the channel is not subscribed or authorized for viewing. The wireless STB 520 may also prompt the end-user to subscribe or order the selected channel.

In an embodiment according to the present invention, upon receiving a channel selection request from an end-user, the wireless STB 520 may wirelessly transmit a channel request to the distribution unit at the local service provider location.

The transmission request may be transmitted by the combination transmitter/receiver 569. In an embodiment according to the present invention, the transmitter and receiver may be separate components, wherein the transmitter wirelessly transmits the channel request to the distribution unit at the local service provider location.

In another embodiment according to the present invention, after power-on the STB 520 may initiate the authentication process with the content server.

At the local service provider location, the channel request may be processed. In an embodiment according to the present invention, the channel request may be validated and authorized at one of the distribution unit or the content server.

If the channel request is validated the content server may initiate transmission of the multimedia information associated with the requested channel. Transmission of the requested channel may also be carried out wirelessly, wherein the wireless transmitter located at the distribution office transmits the multimedia information to the wireless STB 520'.

At the STB 520, the multimedia transmission may be received at antenna 580 and conveyed to processor 561. The multimedia transmission may also be received through a wireline connection 590. The processor 561 may convey the multimedia transmission to audio/video decoder 565. The audio/video decoder may be a combination unit or two separate units in embodiment according to the present invention. The multimedia transmission may be decoded and the transmitted to via cable out put 540 to the TV set for display.

Figure 6:
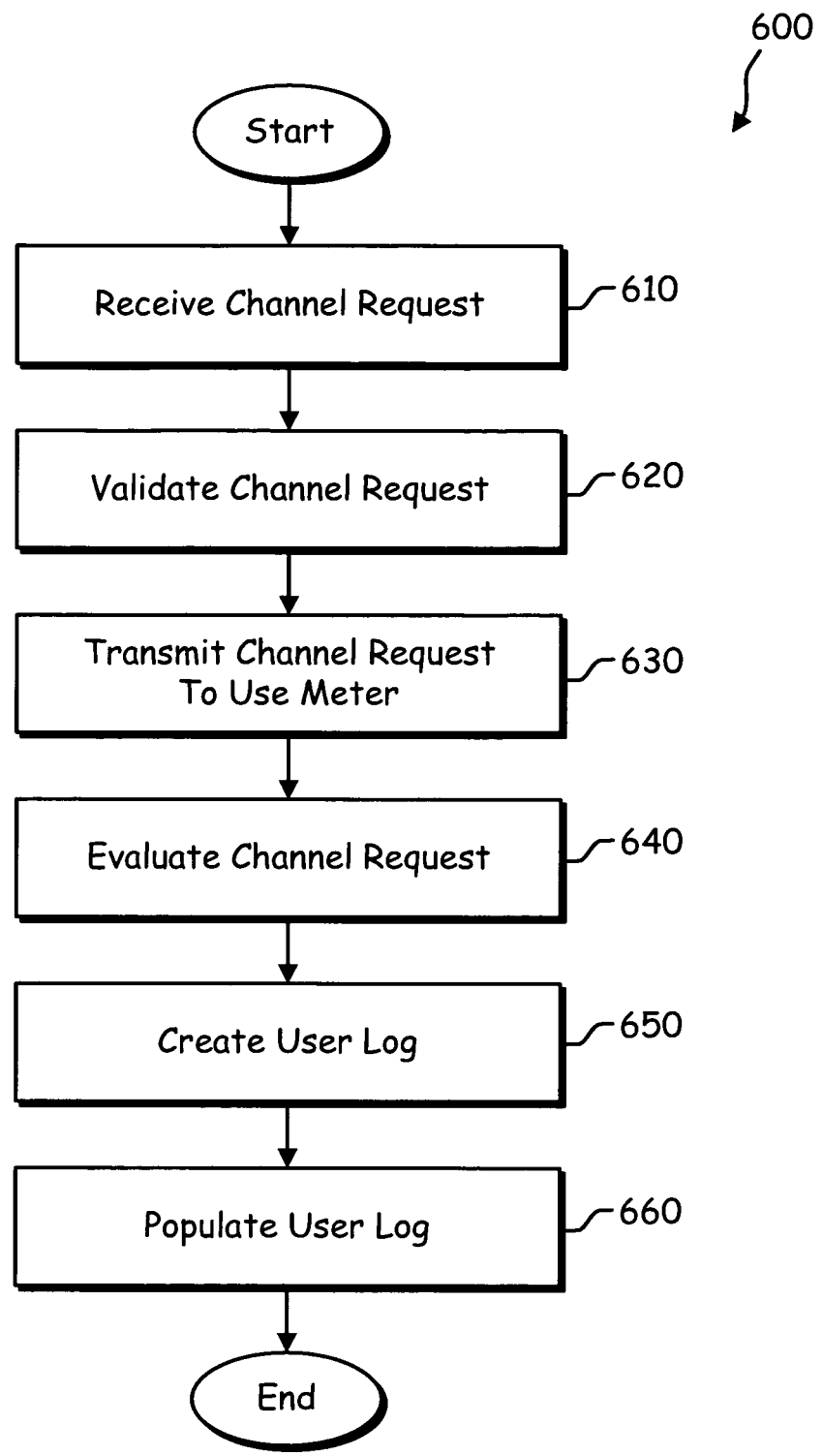
FIG. 6 is a flow diagram illustrating a method of monitoring channel information according to an embodiment of the present invention.

FIG. 6 is a flow diagram 600 illustrating a method of monitoring channel information according to an embodiment of the present invention. In FIG. 6, a channel request may be transmitted from an end-user STB to a local service provider office. The request may be transmitted via wire or wirelessly.

The content server or the distribution unit at the local service provider office may receive the channel request 610 and initiate an evaluation of the channel request to determine whether the channel request is valid and authorized 620. Upon determining that the channel request is authorized, the distribution unit may initiate transmission of the requested channel. If it is determined that the channel request is not authorized, the distribution unit may transmit a message to the end-users STB indicating that the channel request is not authorized.

The channel request may also be submitted to a use meter 630. In the use meter, the channel request may also be evaluated 640. The use meter may create a user log in use memory 650. The use meter may log the channel requested in a memory location in a use memory. The use memory may comprise a plurality of user logs, wherein each user log may be associated with an end-user subscriber. If the end-user subscriber has multiple STBs and associated display apparatuses, the user log may comprise sub-logs. A sub-log may be established for each STB that a subscriber may be using. In an embodiment according to the present invention, a plurality of user logs may be maintained for subscribers having multiple STBs, wherein a separate log may be kept for each corresponding STB.

The user log may be populated with a plurality of channel information and end-user viewing information 660. The user log may comprise a plurality of entries, wherein every time a new channel request is received, a new entry may be created. In another embodiment, the number of entries may be preset at the time of subscription where an entry corresponds to a channel subscribed by a subscriber. The channel requested, beginning viewing time, ending viewing time, program identification information, likely viewer information, etc., may be logged in the entries of the user log.

Figure 7:
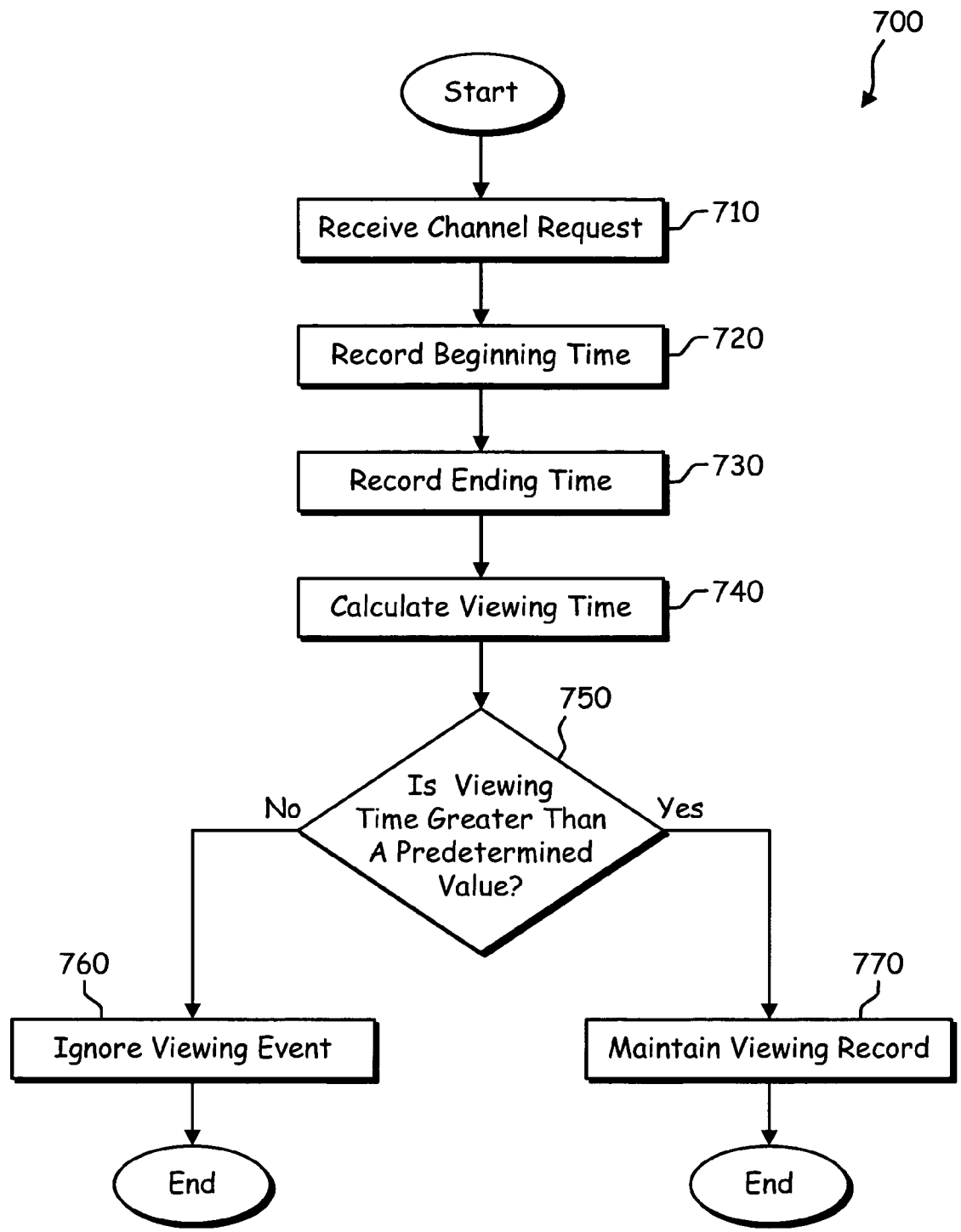
FIG. 7 is a flow diagram illustrating a method of monitoring end-user viewing habits in accordance with an embodiment of the present invention.

FIG. 7 is a flow diagram 700 illustrating a method of monitoring end-user viewing habits in accordance with an embodiment of the present invention. In FIG. 7, channel surfing events may be ignored. The channel request and viewing information may be received at the use meter for monitoring and evaluation 710. The use meter may be programmed to ignore channel transmission lasting less than a predetermined amount of time, for example, a few seconds. The use meter may record the beginning time of channel transmission 720. The use meter may record the ending time of channel transmission 730. The use meter may calculate a viewing time 740. The viewing time may be calculated by subtracting the beginning view time from the ending viewing time.

The calculated viewing time may be compared to a predetermined viewing time value 750. The predetermined viewing time may be a few seconds or a few minutes, depending on the end-user channel evaluation time that a particular end-user demonstrates while channel surfing.

If it is determined that the calculated viewing time is greater than the predetermined viewing time, then the viewing record may be maintained 770. That is, the information may be considered useful for marketing and evaluation purposes if the end-user views a channel for longer than a predetermined amount of time.

However, if is determined that the calculated viewing time is less than the predetermined viewing value, then the logged entry in the user log may be overwritten and the channel information may be ignored 760. That is, the viewing information may not be considered useful in determining viewing habits or targeted marketing based thereon.

Accordingly, when an end-user is channel surfing, the viewing information related to the channel surfing event may be ignored. However, the use meter may create a user log entry indicating that the end-user was channel surfing for a particular length of time.

Channel surfing may be defined by a plurality of channel requests and channel transmission wherein each of the channel transmissions between request last less than a predetermined amount of time.

Figure 8:
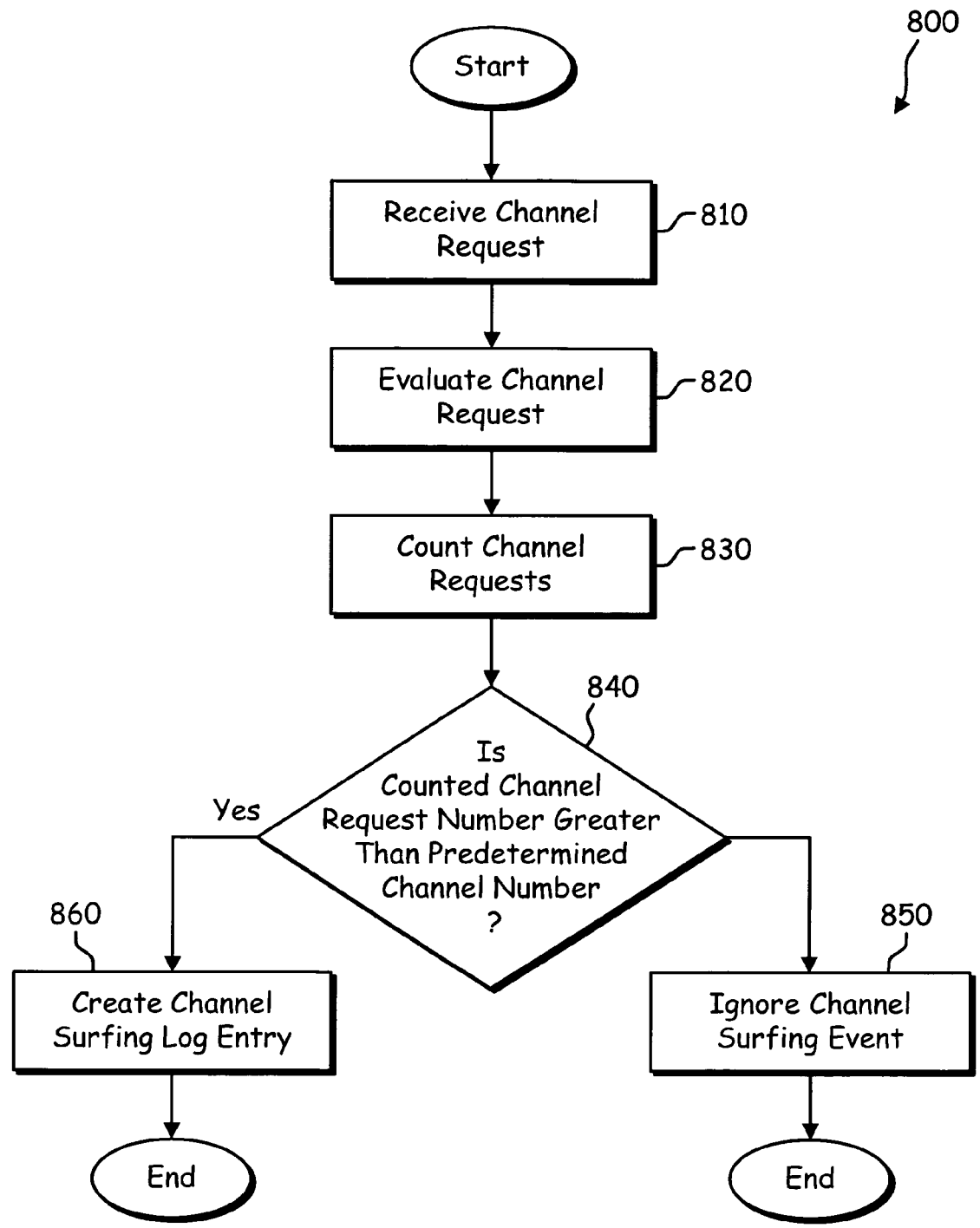
FIG. 8 is a flow diagram illustrating a method of marketing products to subscriber based upon demonstrated viewing habits in accordance with an embodiment of the present invention.

FIG. 8 is a flow diagram 800 illustrating a method of monitoring end-user viewing habits in accordance with an embodiment of the present invention. In FIG. 8, channel surfing events may be ignored. A channel surfing entry in the user log may be created when more than a predetermined number of channel requests are initiated within a predetermined amount of time, for example, more than two channel requests per minute.

A channel request may be received in the use meter 810. The channel request may be evaluated 820. The use meter may count the number of channel requests received in a predetermined period of time 830, for example, one to three minutes.

The counted number of channel requests may be compared to a predetermined channel request number 840. If it is determined that the counted number of channel requests is greater than the predetermined number of channel requests, then a channel surfing entry record may be created and maintained 860.

The channel surfing record may also comprise a value recording the length of time spent of channel surfing and the time of day when channel surfing event occurred, for example, if an end-user spends 30 minutes channel surfing at 7:00 pm, then an entry in the user log may record 30 minutes and the time and date of the channel surfing event.

The channel surfing information may be considered useful for program development and may prompt a service provider to send the subscriber a questionnaire or survey to enable the subscriber to suggest programming of interest to the subscriber. The questionnaire may also be used for marketing and evaluation purposes, wherein the service provider may be enabled to market products and provide purchase incentives to subscribers based upon the information contained in the suggested programming survey.

However, if it is determined that the counted number of channel requests is less than the predetermined channel request number, then the logged entry in the user log may be overwritten and the channel information may be ignored 850. That is, the channel surfing information may not be considered useful in determining targeted marketing based thereon.

Figure 9:
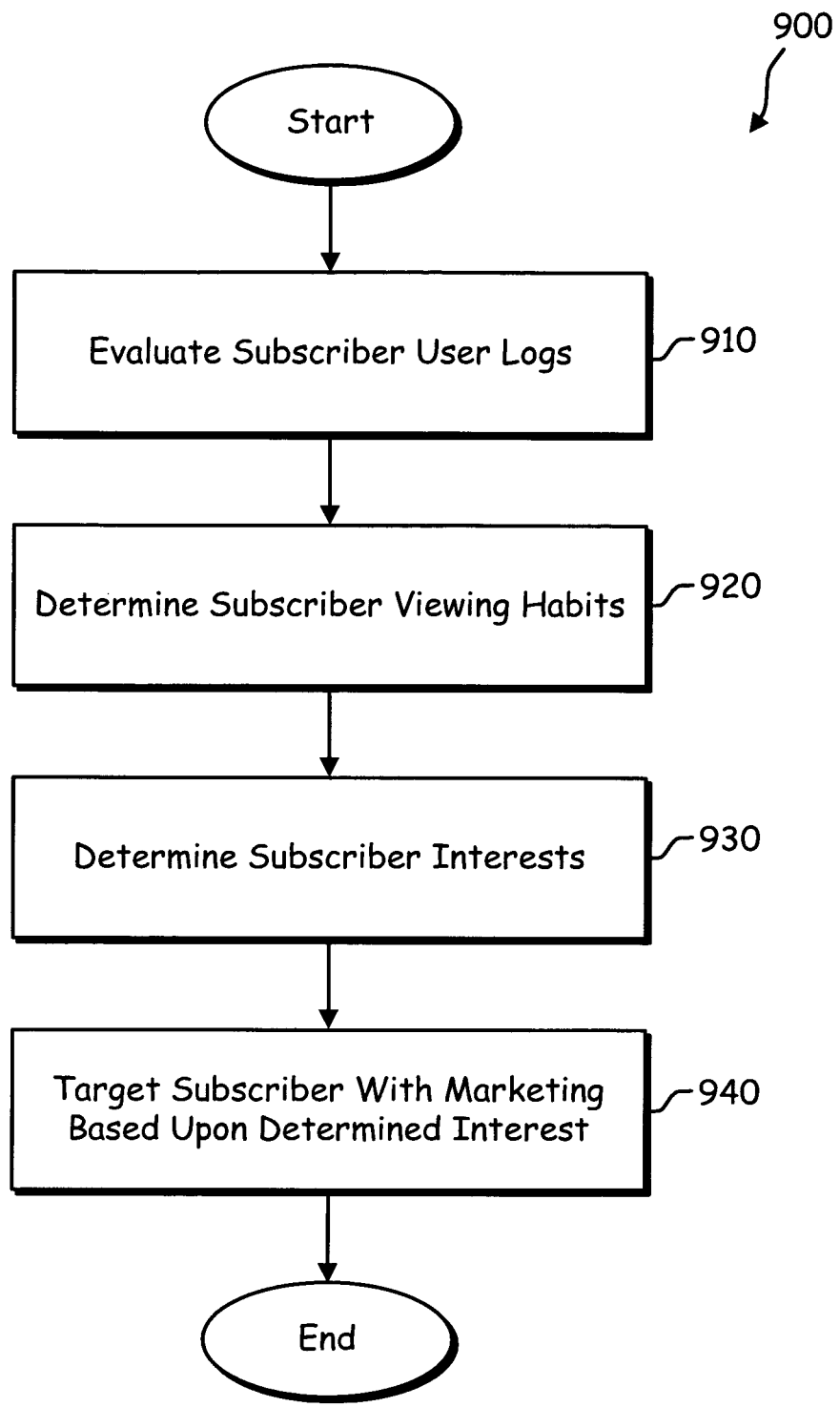

FIG. 9 is a flow diagram 900 illustrating a method of marketing products to subscriber based upon demonstrated viewing habits in accordance with an embodiment of the present invention.

The user logs may subsequently be evaluated 910 to determine an end-user's viewing habits, wherein the end-user's viewing habits 920 may be used to target market products and services to end-users according to the end-user's interests, as demonstrated by the end-user viewing habits.

For example, subscriber interests may be determined by evaluation of subscriber viewing habits. It may be determined, that the subscriber household watches baseball, reality television programs, cartoons, and children's education programming extensively over a predetermined monitoring period, for example, one to three months. The subscriber may be targeted with promotional advertising and product incentives 940 related to baseball, reality television, cartoons, and children's education to entice the subscriber to purchase products and services related to the end-user's demonstrated interests.

In an embodiment according to the present invention, the content server may be adapted to select and transmit advertising and/or captions targeted to a particular user profile saved in the subscriber database. For example, the content server may transmit hospital equipment, pharmaceutical information, and medical product information advertising to doctor and other health professionals.

In an embodiment according to the present invention, end-users may be adapted to opt-out of receiving advertising or receive a reduced quantity of advertising according to explicit end-user preferences. For example, the subscriber may be provided different levels of value added service, such as, gold, silver, bronze, etc. By subscribing to a gold level of service, the subscriber may be able to opt completely out of receiving advertising, for example, no special advertising messages are displayed.

The end-user may be adapted to view and change subscription preferences by accessing a menu transmitted from the network or the STB and displayed on a display apparatus. The end-user subscriber may be adapted to view preferences, subscription status, collected viewing statistics, analyzed viewing habits information, and other information on-demand. The end-user may be adapted to subscribe to additional programming choices, unsubscribe from subscribed programming, update and modify the end-users preferences, etc. on-demand.

In an embodiment according to the present invention, the end-user may select a channel for viewing. The channel may be delivered to the STB from the network. The STB may be left in an active condition, while the display apparatus may be placed in an inactive state. User viewing statistics may be inaccurate if the states of the STB and display apparatus are unknown. In an embodiment according to the present invention the content server may be adapted to determine and detect whether the end-user is watching/viewing the transmitted channel.

The STB may be adapted to detect whether the display apparatus is on or not. If the display apparatus is inactive, the STB may transmit a message to the content server indicating that the display apparatus is inactive. Additionally, the content server may be adapted to terminate transmission of the channel when the display apparatus inactive message is received and it is determined that the end-user is not viewing the channel. Accordingly, an accurate viewer log may be created.

Detection of whether the display apparatus is active or inactive by the STB may be performed by various techniques. For example, the STB may be adapted to evaluate the active/inactive status of at least one electric or electronic component of the display apparatus. For example, the STB may be adapted to read Extended Display Identification Data (EDID) data for an EDID enabled cathode ray tube (CRT) monitors, High-Definition Multimedia Interface (HDMI) monitors, digital flat panel (DFP) monitors, high definition televisions (HDTVs), and standard definition televisions. The STB may also be adapted to test signal lines of connecting buses between the STB output and the display devices.

In an embodiment according to the present invention, the end-user may select a channel for viewing. The content server may transmit the channel to the STB. The display apparatus may be active, but the user may not be physically watching the channel. For example, the end-user may have fallen asleep or left the room and forgot to turn off the system. The user's viewing statistics may be inaccurate.

In an embodiment according to the present invention, the STB may be adapted to detect whether the end-user is physically watching the transmitted channel. The STB may be adapted to periodically prompt the end-user to press a key on the remote control to continue viewing the transmission. When the STB does not receive a response within a particular amount of time, the STB may be powered down and may also transmit a message to the content server to terminate transmission of the channel. Accordingly the user log will accurately reflect the viewing habits of the end-user subscriber.

In an embodiment according to the present invention, a subscriber database may store previous subscriber information and settings for subscribers not currently subscribed to a multimedia information package offered by the network.

In an embodiment according to the present invention, a subscriber database may store user preferences for value added services, wherein the service levels are selected from at least one of gold, silver, and bronze service levels, and wherein the service levels are used to determine an amount of advertisements to be displayed on a subscriber end-user display apparatus.

In an embodiment according to the present invention, the content server may be adapted to select and transmit advertisements targeted based upon a user profile stored in the subscriber database. The targeted advertisements may comprise advertisements corresponding to at least one of a subscriber personal information, a subscriber employment information, a subscriber channel viewing habits, and determined subscriber interests.

In an embodiment according to the present invention, the content server may be adapted to transmit a message to the STB informing an end-user that a selected channel is unavailable for access due to one of unavailability of a requested channel from a satellite and unavailability of the requested channel due to the requested channel being restricted channel to select end-users.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A multimedia distribution network comprising a plurality of set-top-boxes (STBs) configured to request a multimedia channel, the network comprising:
   a content server;
   a distribution unit, wherein the distribution unit is configured to transmit on-demand a plurality of requested multimedia channels to an individual STB, wherein the plurality of requested multimedia channels are transmitted on-demand concurrently to the individual STB,
   and wherein the individual STB is configured to detect whether an end-user display apparatus is inactive, and to transmit a message to the network responsive to the detection, wherein transmission of the plurality of requested multimedia channels is terminated when the end-user display apparatus is determined to be inactive; and a use meter, the use meter is configured to measure a bandwidth consumption of each of the plurality of STBs over a predetermined period of time.

2. The network according to claim 1, wherein the content server is configured to receive and manage a plurality of multimedia transmissions from at least one satellite receiver, the plurality of multimedia transmissions each comprising a plurality of multimedia channels.

3. The network according to claim 1, wherein each of the plurality of STBs is configured to independently request a multimedia channel, wherein the distribution unit is configured to acquire each requested multimedia channel from the content server and independently transmit each requested multimedia channel respectively to each requesting STB on-demand.

4. The network according to claim 1, further comprising a use memory, the use memory is configured to store monitored channel request information corresponding to each of the plurality of STBs for evaluation, the use memory is also configured to record a length of viewing time corresponding to each channel request, wherein the use memory is also configured to record a bandwidth consumed corresponding to each respective channel request.

5. The network according to claim 1, further comprising a use memory, wherein the use meter is configured to create and populate a plurality of user logs in the use memory, the user logs are configured to store monitored channel request information, bandwidth consumed for each corresponding channel request, and length of viewing time of multimedia channel information for each of the plurality of STBs.

6. The network according to claim 5, wherein the user logs comprise at least one of a channel identification number, a channel viewing beginning time, a channel viewing ending time, bandwidth consumed corresponding to a requested channel, a viewed program identification number, a likely viewer identification number, failed channel requests, additional programs viewed on a displayed channel when the displayed channel is displayed for longer than a single initial program length, advertisers displaying advertisements during viewed programs, subject matter associated with the viewed programs, product placement in the viewed programs, and targeted marketing information associated with the viewed programs and advertisements.

7. The network according to claim 1, wherein the distribution unit is configured to communicate with each of the plurality of STBs via one of a wire or wirelessly, the distribution unit comprises a plurality of transmission heads, each of the transmission heads comprising at least one of mechanical, electrical, and electronic switches and relays configured to maintain continuous communication with each of the STBs at a plurality of end-user locations.

8. The network according to claim 1, wherein the distribution unit is configured to communicate with each of the plurality of STBs via one of a wireless receiver, a wired receiver, an optical receiver, a wireless transmitter, an optical transmitter, and a wired transmitter.

9. The network according to claim 1, further comprising a subscriber database memory configured to store subscriber information for each of a plurality of end-user subscribers, the subscriber database memory comprising at least one of a listing of channels subscribed, STB identification information, subscriber spending limits, subscriber modifiable information, and subscriber identity information for authentication.

10. The network according to claim 1, wherein each STB is configured to permit a subscriber end-user to unsubscribe to subscribed programming channels by selecting a corresponding response from an interactive menu displayed by the STB on an end-user display apparatus, wherein the selected response is transmitted to a network component for processing.

11. The network according to claim 1, wherein each STB is configured to permit a subscriber end-user to view information stored in a subscriber memory database corresponding to the subscriber end-user, and the STB is configured to permit the subscriber end-user to view at least one of end-user preferences, subscription status, collected statistics, and viewing habits on an end-user display apparatus on-demand, wherein the information is transmitted to the STB from a network component.

12. The network according to claim 1, wherein multimedia information is communicated to the STB via one of a cable, an optical fiber, and wirelessly.

13. The network according to claim 1, wherein detecting whether the end-user display apparatus is one of active and inactive comprises evaluating at least one component of the end-user display apparatus by the STB.

14. The network according to claim 1, wherein the STB is configured to determine whether an end-user is physically viewing transmitted multimedia information, wherein upon determining that the end-user is not physically viewing the transmitted multimedia information, the STB transmits a message to the network indicating that the end-user is not physically viewing the multimedia information, wherein transmission of multimedia information is terminated.

15. The network according to claim 14, wherein determining whether an end-user is physically viewing the transmitted multimedia information comprises prompting the end-user to interact with the STB.

16. The network according to claim 1, wherein a subscriber database is configured to store previous subscriber information and settings for subscribers not currently subscribed to a multimedia information package offered by the network.

17. The network according to claim 1, wherein a subscriber database is configured to store user preferences for value added services, wherein service levels are selected from at least one of gold, silver, and bronze service levels, and wherein the service levels are used to determine an amount of advertisements to be displayed on a subscriber end-user display apparatus.

18. The network according to claim 1, wherein the content server is configured to select and transmit advertisements targeted based upon a user profile stored in a subscriber database, wherein targeted advertisements comprise advertisements corresponding to at least one of a subscriber personal information, a subscriber employment information, a subscriber channel viewing habits, and determined subscriber interests.

19. The network according to claim 1, wherein the content server is configured to transmit a message to the STB informing an end-user that a selected channel is unavailable for access due to one of unavailability of a requested channel from a satellite and unavailability of the requested channel due to the requested channel being restricted channel to select end-users.

20. The network according to claim 1, wherein a bandwidth of the requested multimedia channel is approximately a transmission rate of the requested multimedia channel.

21. The network of claim 1, wherein the requested multimedia channel is transmitted unencrypted.

22. A set-top-box (STB) configured to request a multimedia channel from a multimedia distribution network, the STB comprising:

a processor configured to process and manage at least one of channel requests, bandwidth requests, and multimedia channel information;
an audio decoder configured to decode audio information received via first and second encoded multimedia channel transmissions;
a video decoder configured to decode video information received via the first and second encoded multimedia channel transmissions;
a data decoder configured to decode data from one of the network and the Internet;
a transmitter configured to transmit channel requests from the STB to the multimedia distribution network;
a receiver configured to receive multimedia channel information and messages associated with the channel requests; and
wherein the processor is configured to detect whether an end-user display apparatus is inactive, and to generate a message to the multimedia distribution network responsive to the detection, wherein transmission of the plurality of requested multimedia channels is terminated when the end-user display apparatus is determined to be inactive, and
wherein a use meter is configured to measure a bandwidth consumption of the STB over a predetermined period of time.

23. The STB according to claim 22, further comprising an antenna for wirelessly communicating with a multimedia distribution unit in the multimedia distribution network.

24. The STB according to claim 22, further comprising a wired connection for communicating with a multimedia distribution unit in the multimedia distribution network.

25. The STB according to claim 22, further comprising a combination audio/video decoder unit, the combination audio/video decoder unit comprising the audio decoder and the video decoder.

26. The STB according to claim 22, further comprising a combination transmitter/receiver unit, the combination transmitter/receiver unit comprising the transmitter and the receiver.

27. The STB according to claim 22, wherein the STB is configured to permit a subscriber end-user to unsubscribe to subscribed programming channels by selecting a corresponding response from an interactive menu displayed by the STB on an end-user display apparatus, wherein the STB is configured to transmit the corresponding response to a network component for processing.

28. The STB according to claim 22, wherein the STB is configured to permit a subscriber end-user to access and view information stored in a subscriber memory database corresponding to the subscriber end-user and an end-user STB, and the STB is configured to permit the subscriber end-user to view at least one of end-user preferences, subscription status, collected statistics, and viewing habits on a display apparatus on-demand, wherein the information is received by the STB from a network component.

29. The STB according to claim 22, wherein a multimedia information provider is configured to communicate to the STB via one of a cable, an optical fiber, and wirelessly.

30. The STB according to claim 22, wherein detecting whether the end-user display apparatus is one of active and inactive comprises evaluating at least one component of the end-user display apparatus.

31. The STB according to claim 22, wherein the STB is configured to determine whether an end-user is physically viewing transmitted multimedia information, wherein upon determining that the end-user is not physically viewing the transmitted multimedia information, the STB configured to transmit a message to the network indicating that the end-user is not physically viewing the multimedia information, wherein transmission of multimedia information is terminated.

32. The STB according to claim 31, wherein determining whether an end-user is physically viewing the transmitted multimedia information comprises prompting the end-user to interact with the STB.

33. The STB according to claim 22, wherein a subscriber database is configured to store previous subscriber information and settings for subscribers not currently subscribed to a multimedia information package offered by the network.

34. The STB according to claim 22, wherein a subscriber database is configured to store user preferences for value added services, wherein service levels are selected from at least one of gold, silver, and bronze service levels, and wherein the service levels are used to determine an amount of advertisements to be displayed on a subscriber end-user display apparatus.

35. The STB according to claim 22, wherein a content server is configured to select and transmit advertisements targeted based upon a user profile stored in a subscriber database, wherein targeted advertisements comprise advertisements corresponding to at least one of a subscriber personal information, a subscriber employment information, a subscriber channel viewing habits, and determined subscriber interests.

36. The STB according to claim 22, wherein the content server is configured to transmit a message to the STB informing an end-user that a selected channel is unavailable for access due to one of unavailability of a requested channel from a satellite and unavailability of the requested channel due to the requested channel being restricted channel to select end-users.

37. An apparatus, the apparatus comprising:
a set-top-box (STB) configured to request a multimedia channel from a multimedia distribution network, the STB comprising:
a processor configured to process and manage at least one of channel requests, bandwidth requests, and multimedia channel information;
an audio decoder operably coupled to the processor and configured to decode audio information received via first and second encoded multimedia channel transmission transmissions;
a video decoder operably coupled to the processor and configured to decode video information received via the first and second encoded multimedia channel transmissions;
a data decoder operably coupled to the processor and configured to decode data from one of the network and the Internet;
a transmitter operably coupled to the processor and configured to transmit channel requests from the STB to the multimedia distribution network; and
a receiver operably coupled to the processor and configured to receive multimedia channel information and messages associated with the channel requests; and
wherein the processor is configured to detect whether an end-user display apparatus is inactive, and to generate a message to the multimedia distribution network responsive to the detection, wherein transmission of requested multimedia channels is terminated when the end-user display apparatus is determined to be inactive, and
wherein a use meter is configured to measure a bandwidth consumption of the STB over a predetermined period of time.

* * * * *